(12) United States Patent
Perreault et al.

(10) Patent No.: US 9,450,506 B2
(45) Date of Patent: Sep. 20, 2016

(54) APPARATUS FOR MULTI-LEVEL SWITCHED-CAPACITOR RECTIFICATION AND DC-DC CONVERSION

(71) Applicant: Massachusetts Institute of Technology, Cambridge, MA (US)

(72) Inventors: David J. Perreault, Andover, MA (US); Wei Li, Monterey, CA (US); Nathaniel Jay T. Salazar, San Diego, CA (US)

(73) Assignee: Massachusetts Institute of Technology, Cambridge, MA (US)

(*) Notice: Subject to any disclaimer, the term of this patent is extended or adjusted under 35 U.S.C. 154(b) by 20 days.

(21) Appl. No.: 14/416,654

(22) PCT Filed: Aug. 13, 2013

(86) PCT No.: PCT/US2013/054658
§ 371 (c)(1),
(2) Date: Jan. 23, 2015

(87) PCT Pub. No.: WO2014/028441
PCT Pub. Date: Feb. 20, 2014

(65) Prior Publication Data
US 2015/0188448 A1 Jul. 2, 2015

Related U.S. Application Data

(60) Provisional application No. 61/682,420, filed on Aug. 13, 2012.

(51) Int. Cl.
*H02M 7/217* (2006.01)
(52) U.S. Cl.
CPC .................. *H02M 7/217* (2013.01)
(58) Field of Classification Search
CPC ................ H02M 7/217; H02M 3/07; H02M 2001/009; H02M 2001/0058; H02M 2003/072
See application file for complete search history.

(56) References Cited

U.S. PATENT DOCUMENTS

| | | | |
|---|---|---|---|
| 6,084,789 A * | 7/2000 | Van Lieshout | H02M 3/07 307/110 |
| 6,256,214 B1 * | 7/2001 | Farrington | H02M 1/38 363/127 |

(Continued)

FOREIGN PATENT DOCUMENTS

| | | |
|---|---|---|
| JP | 2010-74930 A | 4/2010 |
| JP | 2012-65434 A | 3/2012 |

(Continued)

OTHER PUBLICATIONS

U.S. Appl. No. 14/035,445, filed Sep. 24, 2013, Perreault.

(Continued)

*Primary Examiner* — Timothy J Dole
*Assistant Examiner* — Yusef Ahmed
(74) *Attorney, Agent, or Firm* — Daly, Crowley, Mofford and Durkee, LLP

(57) ABSTRACT

A voltage-step down rectifier topology suitable for integration on a die of an integrated circuit is described. In one embodiment, a switched capacitor rectifier is provided having an architecture such that an input voltage swing of the switched-capacitor rectifier is a factor N times an output voltage where N depends upon the number of stages such that the switched-capacitor rectifier can provide a $\pi/(2N)$ step-down voltage conversion ratio between an input fundamental ac peak voltage to the output dc voltage. In one embodiment, the rectifier is used in dc-dc conversion. In one embodiment, the rectifier is used in ac power delivery to low-voltage electronics.

20 Claims, 15 Drawing Sheets

(56) References Cited

U.S. PATENT DOCUMENTS

| | | | |
|---|---|---|---|
| 6,563,235 B1* | 5/2003 | McIntyre | H02M 3/07 307/109 |
| 6,573,760 B1* | 6/2003 | Gabara | H05K 5/2481 327/359 |
| 6,597,593 B1 | 7/2003 | Cruz et al. | |
| 7,042,742 B2* | 5/2006 | Lin | H02M 3/073 363/59 |
| 7,190,210 B2* | 3/2007 | Azrai | H02M 3/07 257/298 |
| 7,535,133 B2 | 5/2009 | Perreault et al. | |
| 7,589,605 B2 | 9/2009 | Perreault et al. | |
| 7,622,984 B2* | 11/2009 | Lesso | H02M 3/07 327/535 |
| 7,889,519 B2 | 2/2011 | Perreault et al. | |
| 7,948,221 B2* | 5/2011 | Watanabe | H02M 3/158 307/110 |
| 7,990,742 B2* | 8/2011 | Lesso | H02M 3/07 363/60 |
| 8,026,763 B2 | 9/2011 | Dawson et al. | |
| 8,164,384 B2 | 4/2012 | Dawson et al. | |
| 8,212,541 B2* | 7/2012 | Perreault | H02M 3/07 323/271 |
| 8,427,851 B2* | 4/2013 | Lesso | H02M 3/07 323/267 |
| 8,451,053 B2 | 5/2013 | Perreault et al. | |
| 8,643,347 B2 | 2/2014 | Perreault | |
| 8,659,353 B2 | 2/2014 | Dawson et al. | |
| 8,699,248 B2 | 4/2014 | Perreault et al. | |
| 8,718,188 B2 | 5/2014 | Balteanu et al. | |
| 8,824,978 B2 | 9/2014 | Briffa et al. | |
| 8,829,993 B2 | 9/2014 | Briffa et al. | |
| 8,830,709 B2 | 9/2014 | Perreault | |
| 8,830,710 B2 | 9/2014 | Perreault et al. | |
| 8,957,727 B2 | 2/2015 | Dawson et al. | |
| 9,020,453 B2* | 4/2015 | Briffa | H03G 3/3042 330/124 R |
| 9,054,576 B2* | 6/2015 | Kang | H02M 3/07 |
| 9,236,794 B2* | 1/2016 | Lesso | H02M 3/07 |
| 2005/0286278 A1 | 12/2005 | Perreault et al. | |
| 2006/0022660 A1* | 2/2006 | Itoh | H02M 3/07 323/312 |
| 2009/0072800 A1* | 3/2009 | Ramadass | H02M 3/07 323/271 |
| 2009/0278520 A1* | 11/2009 | Perreault | H02M 3/07 323/282 |
| 2011/0101938 A1* | 5/2011 | Ma | H02M 3/07 323/282 |
| 2012/0218797 A1* | 8/2012 | Li | H02M 7/217 363/126 |
| 2013/0241625 A1 | 9/2013 | Perreault et al. | |
| 2014/0118065 A1 | 5/2014 | Briffa et al. | |
| 2014/0118072 A1 | 5/2014 | Briffa et al. | |
| 2014/0120854 A1 | 5/2014 | Briffa et al. | |
| 2014/0167513 A1 | 6/2014 | Chang et al. | |
| 2014/0226377 A1* | 8/2014 | Goetz | H02M 3/158 363/65 |
| 2014/0226378 A1 | 8/2014 | Perreault | |
| 2014/0313781 A1 | 10/2014 | Perreault et al. | |
| 2014/0339918 A1 | 11/2014 | Perreault et al. | |
| 2014/0355322 A1 | 12/2014 | Perreault et al. | |
| 2015/0023063 A1 | 1/2015 | Perreault et al. | |
| 2015/0155895 A1* | 6/2015 | Perreault | H04B 1/0458 455/127.3 |

FOREIGN PATENT DOCUMENTS

| | | |
|---|---|---|
| WO | WO2013086445 A1 | 6/2013 |
| WO | WO 2013/191757 A1 | 12/2013 |
| WO | WO 2014/028441 A2 | 2/2014 |
| WO | WO 2014/070998 A1 | 5/2014 |

OTHER PUBLICATIONS

U.S. Appl. No. 14/338,671, filed Jul. 23, 2014, Briffa, et al.
U.S. Appl. No. 14/758,033, filed Jun. 26, 2015, Perreault, et al.
U.S. Appl. No. 14/791,685, filed Jul. 6, 2015, Perreault, et al.
U.S. Appl. No. 14/837,616, filed Aug. 27, 2015, Briffa, et al.
U.S. Appl. No. 14/823,220, filed Aug. 11, 2015, Barton, et al.
U.S. Appl. No. 14/934,760, filed Nov. 6, 2015, Briffa, et al.
U.S. Appl. No. 14/920,031, filed Oct. 22, 2015, Briffa, et al.
U.S. Appl. No. 14/619,737, filed Feb. 11, 2015, Perreault, et al.
PCT Transmittal of International Preliminary Report on Patentability of the ISA for PCT/US2013/054658 dated Feb. 26, 2015; 7 pages.
Han, et al.; Analysis and Design of High Efficiency Matching Networks; IEEE Transactions on Power Electronics; vol. 21; No. 5, Sep. 2006; pp. 1484-1491.
Li, et al.; "Switched-Capacitor Step-Down Rectifier for Low-Voltage Power Conversion;" IEEE Applied Power Electronics Conference and Exposition (APEC); Mar. 17-21, 2013; pp. 1884-1891.
Perreault, et al.; "Power Delivery and Conversion for Microprocessors;" Semiconductor Research Corporation; FCRP; e-workshop; Jul. 19, 2012; 45 pages.
Perreault, et al.; IFC Biannual Review; Aug. 18, 2011; 19 pages.
Rodriguez, et al.; "A Multilevel Inverter Topology for Inductively-Coupled Power Transfer;" IEEE, Applied Power Electronics Conference and Exposition, 2003 (APEC); vol. 2; Feb. 9-13, 2003; pp. 118-1126.
Yao, et al.; "Microfabricated V-Groove Power Inductors Using Multilayer Co-Zr-O thin Films for Very-High-Frequency DC-DC Converters;" Energy Conversion Congress and Exposition (ECCE); Sep. 17-22, 2011; pp. 1845-1852.
PCT Search Report of the ISA for PCT/US2013/054658 dated Jan. 29, 2014.
PCT Written Opinion of the ISA for PCT/US2013/054658 dated Jan. 29, 2014.
U.S. Appl. No. 14/968,045, filed Dec. 14, 2015, Perreault et al.
U.S. Appl. No. 14/974,563, filed Dec. 18, 2015, Perreault et al.
U.S. Appl. No. 14/975,742, filed Dec. 19, 2015, Perreault et al.
U.S. Appl. No. 15/149,491, filed May 9, 2016, Perreault, et al.

\* cited by examiner

APPARATUS FOR MULTI-LEVEL SWITCHED-CAPACITOR RECTIFICATION AND DC-DC CONVERSION

BACKGROUND

As is known in the art, a power conversion circuit (or power converter) is an electrical or electro-mechanical device for converting electrical energy. One class of power converter is a dc-to-dc converter which converts a source of direct current (dc) from one voltage level to another utilizing inverting and rectifying devices.

As is also known, power conversion becomes more challenging for state-of-the-art low-voltage electronic circuits, including portable electronic devices, digital electronics, sensors and communication circuits among many items due to the desire of higher voltage conversion ratio and rapidly increasing power demand. The size and cost of the power conversion electronics (such as dc-dc converters) for these applications are also important, and can limit overall system design.

As is also known, a buck converter is a step-down dc-to-dc converter which utilizes a switched-mode power supply that uses multiple switches, an inductor and a capacitor. Prior art dc-dc converters implemented utilizing conventional buck converters have no transformation stage. Thus, inverting and rectifying devices in such converters are each exposed to both high current and high voltage signals. This makes such prior art approaches unattractive for high-conversion-ratio on-die dc-dc converters.

Referring now to FIG. 1, many conventional dc-dc converters 10 include a transformation stage 12 in addition to inverter 14 and rectification stages 16. DC-DC converter topologies having a transformation stage (e.g. coupled-inductor buck, flyback, etc.) primarily operate using only low-voltage rectifier devices. Furthermore, conventional converters having topologies which include a transformation stage requiring coupled magnetic circuit elements (e.g. transformers) which are difficult to manufacture on an integrated circuit die and which often have low efficiency. Moreover, inverter devices used in the aforementioned conventional dc-dc-converter circuits must be capable of fast operation while also being able to handle high voltage levels and are unavailable in circuits fabricated using conventional, commercially viable processing techniques.

The need for a step-down rectifier as introduced here is driven by the conversion ratio of conventional rectifiers for high-frequency rectification, which do not provide a desirable step down: from the ac voltage amplitude to the dc output. This places a greater burden on the transformation stage to achieve a large step-down, and the efficiency a matching network (or other transformer) is often inversely proportional to the voltage conversion ratio.

For example, and with reference now to FIG. 2, a traditional half-bridge rectifier 20 provides a $\pi/2$ voltage conversion ratio between an input fundamental ac peak voltage to the output dc voltage $V_{dc}/V_{ac,pk}$ (FIG. 2A). This step up in voltage in the rectification stage has the effect of decreasing the overall conversion ratio in a step down system. If the rectification stage could exhibit step-down characteristics, then the voltage transformation ratio in the transformation stage can be reduced while maintaining the same conversion ratio in the system as whole and hence improve the system performance. A full-bridge rectifier doubles the input voltage swing and gives a step-down voltage ratio of $\pi/4$. However, isolation is required for the full-bridge rectifier which increases the complexity of the system. As a result, a rectifier with higher step-down voltage conversion ratio is desired. It should be appreciated that while the half-bridge rectifier of FIG. 2 is here shown implemented with diodes, such rectifiers are more typically implemented with CMOS transistors acting as synchronous rectifiers.

SUMMARY

Described herein are new topologies for multi-step, switched-capacitor rectifier circuits including step-down and step-up rectifiers. The rectifiers described herein utilize high step-down ratios which reduces a transformation ratio which must be provided by a transformation stage (which may be implemented with a matching network, transformer, or other element). This results in circuits having improved efficiency. The multi-step, switched-capacitor rectifier circuit topologies described herein are able to: leverage CMOS devices for rectification and maintain low blocking voltage for CMOS devices and can be used to construct ac power delivery system and/or GaN/Si dc-dc converters having performance characteristics which are improved compared with like characteristics of prior art systems and converters.

In accordance with the concepts, systems, circuits and techniques described herein, a multi-step, switched-capacitor rectifier circuit includes a bridge circuit having an input configured to receive an alternating current (AC) signal and a pair of output terminals. The bridge circuit includes a bridge storage element coupled across the output thereof. Bridge circuit switching elements are operable to selectively couple the bridge storage element to the bridge circuit inputs input terminals of a rectifier stage are coupled to the output of the bridge circuit. The rectifier stage has a pair of output terminals having a rectifier storage element coupled there between with the rectifier stage configured to provide an output signal at the pair of output terminals. The rectifier stage further includes control switches which selectively couples the rectifier storage element to the bridge circuit output.

With this particular arrangement, a multi-step, switched-capacitor rectifier circuit is provided. A switched-capacitor rectifier circuit comprising a bridge circuit (e.g. a half-bridge circuit) and one rectifier stage functions as a two-step switched-capacitor rectifier circuit while a switched-capacitor rectifier circuit comprising a bridge circuit and N rectifier stages functions as an N+1 step switched-capacitor rectifier circuit.

In step-down rectification topologies described herein the multi-step, switched-capacitor rectifier circuit utilizes a relatively higher step-down ratio in the rectifier circuit. This approach reduces the transformation ratio in the transformation stage (e.g. a transformation ratio provided by a transformer or matching network or other type of transformation network or element), and thus improves efficiency. When an input ac current is positive, switches are configured (open or closed) to connect capacitors such that positive current charges a first capacitor provided as part of the bridge stage (i.e. a bridge capacitor). This current recharges a second capacitor provided as part of the rectifier stage (i.e. a rectifier capacitor) during at least a portion of this state, and this current and the current in the rectifier capacitor support a load current. Since both the bridge and rectifier capacitors hold the same voltage Vo at steady-state, the input voltage of the SC rectifier is approximately 2Vo in this state. When the input current is negative, switches in the bridge and rectifier circuits are configured (e.g. either open or closed) such that bridge and inverter capacitors are connected in parallel to support the load and an input of the SC rectifier is shorted to a reference potential (typically ground). An additional dc blocking element such as a capacitor may be placed in series with an input of the rectifier in order to block the dc voltage component at the rectifier input from appearing at circuits driving the rectifier.

In step-up rectification topologies, the multi-step, switched-capacitor rectifier circuit utilizes a relatively high step-up ratio in the rectifier circuit. This approach reduces the transformation ratio in the matching network, and thus improves efficiency while the voltage transformation of the whole system maintains the same.

In some embodiments, the bridge circuit is provided as a flying half-bridge circuit while in other embodiments, the bridge circuit is provided as a full-bridge circuit.

In one embodiment, the multi-step, switched-capacitor rectifier circuit is implemented as a voltage step-down rectifier. The need for a step-down rectifier as described herein is driven by the conversion ratio of conventional rectifiers for high-frequency rectification, which do not provide a desirable step down from the ac voltage amplitude to the dc output. This places a greater burden on the transformation state to achieve a large step-down, and the efficiency a matching network (or other transformer) is often inversely proportional to the voltage conversion ratio.

In one embodiment, the multi-step, switched-capacitor rectifier circuit is implemented as a voltage step-up converter. By driving the rectifier in reverse, the rectifier can operate as an inverter having a large step-up voltage conversion ratio. When implemented in this manner, the circuit provides a square wave output signal having a relatively large amplitude. Although such a voltage step-up rectifier may be considered more crude than achievable with other types of inverters (e.g. a Marx inverter), this approach takes advantage of the self-driven nature of many of the switches in a CMOS implementation to provide a distinct performance advantage.

In one embodiment, a multi-step, switched-capacitor rectifier circuit may be coupled with an inverter and a transformation stage to provide a dc-dc converter. In such an embodiment, the rectifier provides a dc-dc converter having improved voltage transformation capabilities as compared to conventional converters. The inverter may be realized with high-voltage low-current devices (either on the same the as the rectifier or a different die) and the transformation stage may be realized with magnetic elements (transformers or inductors) realized on or off the rectifier die. A switched capacitor rectifier driven from an inductive ac source, or an ac source that looks similar to a current source having an architecture such that an input voltage swing of the switched-capacitor rectifier is N times the output voltage depending upon the number of stages. Hence, the switched-capacitor rectifier can provide a $\pi/(2N)$ step-down voltage conversion ratio between the input fundamental ac peak voltage to the output dc voltage ($V_{dc}/V_{ac,pk}$). This increases the step down transformation in the rectification stage of a DC-DC or AC-DC power converter.

It has also been recognized in accordance with the concepts, system and techniques described herein, that future computation systems pose a major challenge in energy delivery that is difficult to meet with existing devices and design strategies. Delivery of power to an integrated circuit die at the final very low voltage requires a dominant portion of the chip pin count that could be better employed for computation and communication. Moreover, systems and techniques presently being used lead to challenges of voltage control (drop) and conductor loss both on die and in interconnect(s) to the die. To reduce interconnect bottlenecks and enable more flexible computation and energy utilization, it is desired to deliver power across the interconnect at high voltage and low current with on-die or over-die transformation to low voltage and high current, while providing localized voltage regulation in numerous zones.

Thus, in accordance with a further aspect of the concepts, systems, circuits and techniques described herein, a multi-step, switched-capacitor rectifier circuit may be incorporated in an ac power delivery architecture for low-voltage integrated power delivery. Such an ac power delivery system includes an inverter having an input configured to be coupled to an input source and having an output coupled to an input of an integrated transformation stage via an interconnect implemented as a transmission line interconnect (e.g. a distributed L, C transmission line). An output of the integrated transformation stage is coupled to an input of a multi-step, switched-capacitor rectifier circuit and an output of the multi-step, switched-capacitor rectifier circuit is configured to provide an output voltage at an output thereof.

When the switched capacitor rectifier is driven from an inductive ac source, or an ac source that looks similar to a current source, an input voltage swing of the switched-capacitor rectifier is N times the output voltage depending upon the number of stages. And hence, the switched-capacitor rectifier can provide a n/(2N) step-down voltage conversion ratio between the input fundamental ac peak voltage to the output dc voltage ($V_{dc}/V_{ac,pk}$). This approach reduces (or ideally minimizes) the step down conversion ratio of a transformation stage in AC power delivery system to provide better performance.

AC distribution in this application has important merits such as: allowing high-voltage and low current distribution; allowing the use of low-voltage CMOS rectifiers on die; and, in applications including an inverter, enabling the inverter to be placed off die where size and loss are less important and where it can be effectively realized in a non-CMOS device process. An alternative to magnetic transformers for providing voltage transformation is the use of matching networks or immittance conversion networks, which require only inductors and capacitors to realize. With the emergence of high-efficiency, high-power-density integrated inductors at very high frequencies (VHF) practical ac power delivery system may be manufactured.

Accordingly, the multi-step, switched-capacitor rectifier circuit described herein may be used in at least applications relating to dc-dc conversion as well as to ac power delivery to low-voltage electronics.

It should be understood that while circuit and system operation is sometimes described herein with approximately 50% duty ratio of switching and sinusoidal input currents, it will be appreciated that other duty ratios, operating characteristics and modes are possible and are considered to be within the scope of the concepts described and claimed herein. For example, one may switch between the two states with other than 50% duty ratio, and may use duty ratio as a means of control. Duty ratio will affect the relation between the input ac voltage and its frequency components and the dc output voltage. The frequency with which the rectifier is switched, and the relative phase of the rectifier operation (with respect to an inverter and/or with respect to the phase of the input current) may also be used as control mechanisms in a power conversion system. Likewise, the input current may have various frequency content, including harmonics of the fundamental switching frequency and dc.

Furthermore, in some embodiments, it is possible to leverage CMOS devices for rectification, maintain low blocking voltage for CMOS devices. It is recognized that in at least some applications a trade-off may be made between the above advantages and higher device count and greater control complexity.

The circuits, systems and techniques described herein can be used to provide improved power delivery and conversion (e.g. improved power delivery and conversion for microprocessors for example). The circuits, systems and techniques enable power delivery across interconnects at high voltage and low current. Also, on or over die transformation to low voltage/high current can be made with localized adaptive regulation of voltage in numerous zones. This results in efficiency and power density commensurate with the needed levels of size. The circuits, systems and techniques described herein are capable of achieving needed transformation and multi-point regulation.

BRIEF DESCRIPTION OF THE DRAWINGS

The foregoing features of the concepts, systems and techniques described herein may be more fully understood from the following detailed description of the drawings, in which.

DETAILED DESCRIPTION

Figure 1:
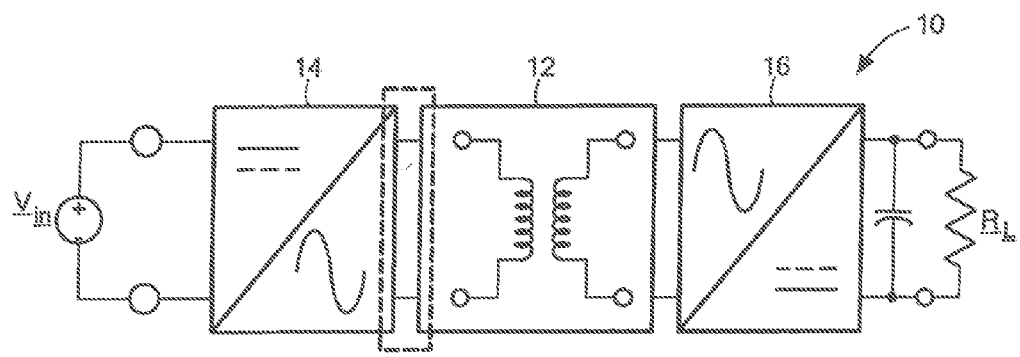
FIG. 1 is a block diagram of a prior art direct current-to-direct current (dc-dc) converter.
Figure 2:
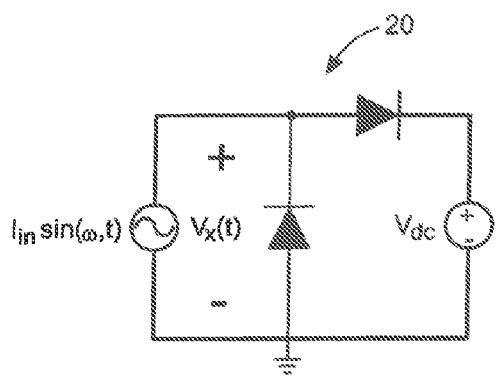
FIG. 2 is a block diagram of a prior art half-bridge rectifier circuit.
Figure 2A:
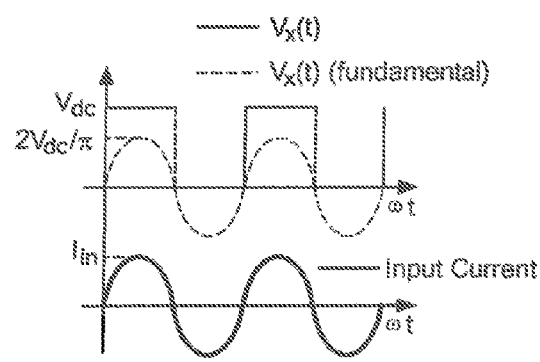
FIG. 2A is a plot of current and voltage vs. phase (in radians) for the half bridge rectifier circuit of FIG. 2.

Before describing detailed exemplary embodiments of a multi-step, switched-capacitor rectifier circuit, some introductory concepts and terminology are explained.

It should first be appreciated that the concepts, systems, circuits and techniques described herein related to multi-step, switched-capacitor rectification and power conversion are sometimes described with reference to a multi-step, switched-capacitor rectifier circuit having a specific number of steps (e.g. a two-step, switched-capacitor rectifier circuit). Such reference is not intended to be and should not be construed as limiting. It is recognized that the multi-step, switched-capacitor rectifier circuit described herein may be provided having any number of steps (one or more steps). One of ordinary skill in the art, after reading the disclosure provided herein, will understand how to select the number of steps to use in any particular application.

Furthermore, reference is sometimes made herein to multi-step, switched-capacitor rectifier circuitry (or systems utilizing such circuitry) described as operating with a specific duty ratio of switching and sinusoidal input currents (i.e. a duty ratio of switching and sinusoidal input currents of approximately 50%). It is recognized, however, that other duty ratios not specifically enumerated herein are also possible and are within the scope of the concepts, systems, circuits and techniques described herein. It is recognized, for example, that one may switch between two states with other than 50% duty ratio, and may use duty ratio as a means of control. Duty ratio will affect the relation between the input ac voltage and its frequency components and the dc output voltage. The frequency with which the rectifier is switched, and the relative phase of the rectifier operation (with respect to an inverter and/or with respect to the phase of the input current) may also be used as control mechanisms in a power conversion system. Likewise the input current may have various frequency content, including harmonics of the fundamental switching frequency and dc. One of ordinary skill in the art, after reading the disclosure provided herein, will understand how to select a duty ratio (or duty ratios) for use in any particular application. It is recognized, for example, that one may switch between two states with other than 50% duty ratio, and may use duty ratio as a means of control. Duty ratio will affect the relation between the input ac voltage and its frequency components and the dc output voltage. The frequency with which the rectifier is switched, and the relative phase of the rectifier operation (with respect to an inverter and/or with respect to the phase of the input current) may also be used as control mechanisms in a power conversion system. Likewise the input current may have various frequency content, including harmonics of the fundamental switching frequency and dc.

It is further recognized, that multi-step, switched-capacitor rectifier circuitry having operating characteristics and modes not specifically enumerated herein are possible and are within the scope of the broad concepts, systems, circuits and techniques described herein.

It should also be understood that reference is sometimes made herein to integrated circuits (IC's or chips) constructed using specific types of semiconductor technology (e.g. complementary metal-oxide-semiconductor (CMOS)). It should be understood that the broad concepts described herein may be implemented in any type semiconductor technology (i.e. both processes used to implement that circuitry on integrated circuits as well as the circuitry itself). In some applications, the multi-step, switched-capacitor rectifier circuits described herein find use in circuits and systems implemented using gallium nitride (GaN) semiconductor technology as well as in Gallium Nitride/Silicon (GaN/Si) semiconductor technology. Also, the circuits and concepts described herein may be implemented using a variety of different material systems (e.g. Silicon CMOS or GaN/Si dc-dc converters) and/or different device types (e.g., Silicon LDMOS/CMOS conversion or HEMT/CMOS conversion).

Reference is also sometimes made herein to particular applications. For example, multi-step, switched-capacitor rectifier circuits are sometimes described herein for use with dc-dc converter and ac power delivery applications. Such references are intended merely as exemplary should not be taken as limiting the concepts described herein to those particular applications. It should thus be appreciated that the multi-step, switched-capacitor rectifier circuits and concepts described herein may also find use in other applications. Applications of these rectifiers may include dc-dc converters or ac-dc converters such as for powering digital logic or devices, rectifiers operating as part of rectenna devices or as part of wireless power transfer systems, inverters for synthesizing ac outputs from dc inputs, etc.

It should thus be appreciated that, in an effort to promote clarity in explaining the concepts, reference is sometimes made herein to specific multi-step, switched-capacitor circuits or specific multi-step, switched-capacitor circuit topologies. It should thus be understood that such references are merely exemplary and should not be construed as limiting. After reading the description provided herein, one of ordinary skill in the art will understand how to apply the concepts described herein to provide specific multi-step, switched-capacitor circuits or specific switched capacitor circuit topologies.

Reference is also sometimes made herein to circuits having switches or capacitors. It should be appreciated that any switching elements or storage elements having appropriate electrical characteristics (e.g. appropriate switching or storage characteristics) may, of course, be used.

Thus, although the description provided herein below explains concepts sought to be protected in the context of a particular circuit or a particular application or a particular voltage or voltage range, those of ordinary skill in the art will appreciate that the concepts equally apply to other circuits or applications or voltages or voltage ranges.

Figure 3:
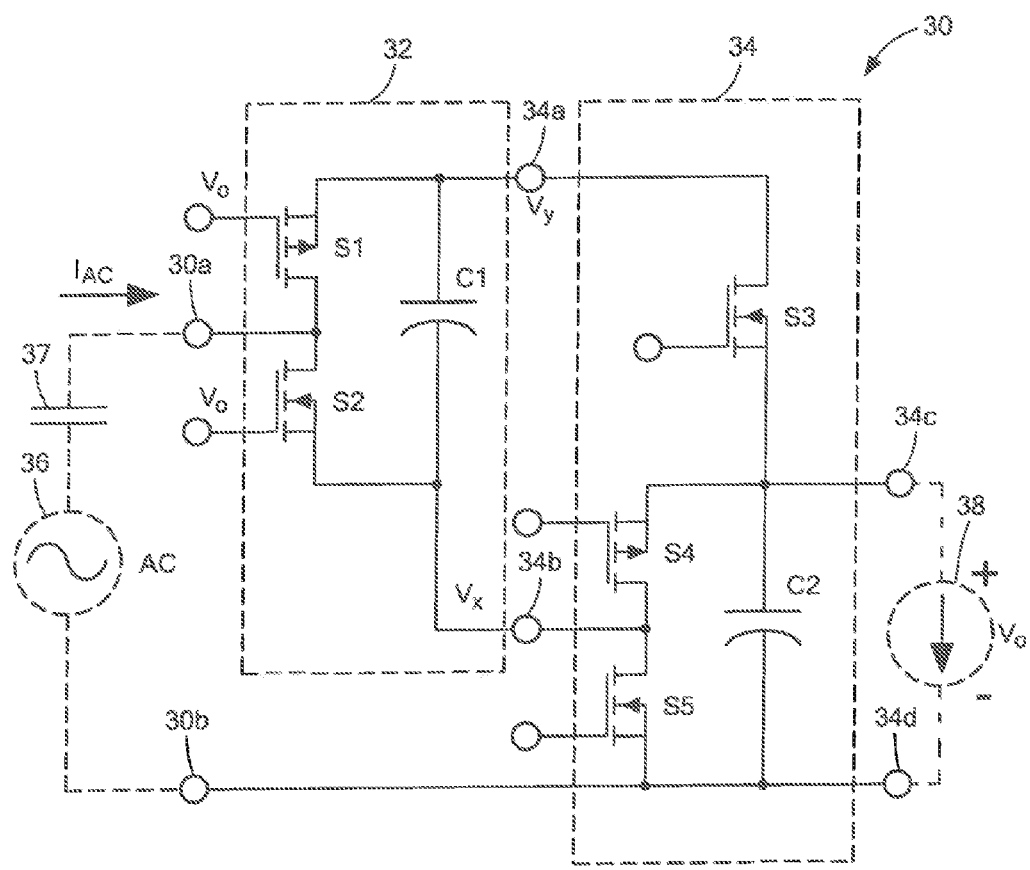
FIG. 3 is a block diagram of a two-step switched-capacitor rectifier circuit.

Referring now to FIG. 3, a two-step (or two-level) switched-capacitor rectifier circuit 30 which is used to illustrate rectifier operation includes a flying half-bridge circuit 32 coupled to a rectifier stage 34. A voltage source 36 (here shown in phantom since it is not properly a part of the two-level switched-capacitor rectifier circuit 30 is coupled through a capacitor 37 to a pair of input terminals 32a, 32b of flying half bridge circuit 32 and a load 38 (also shown in phantom since it is not properly a part of the rectifier circuit 30) coupled to output terminals 34a, 34b of rectifier stage 34 and across which is generated an output voltage Vo.

The flying half-bridge 32 and rectifier stage 34 each include one or more switch components and one or more energy storage components. In this exemplary embodiment, flying half-bridge 32 includes switches S1, S2 having bias or control terminals coupled to output voltage Vo and an energy storage component C1, which is here provided a capacitor, coupled across the bias terminals of the switches S1, S2. In the exemplary embodiment of FIG. 3, switches S1, S2 are provided as field effect transistor (FETs) having source, gate and drain electrodes and in particular transistor S1 corresponds to a P-channel enhancement mode metal oxide semiconductor FET (MOSFET) while transistor S2 corresponds to an N-channel enhancement mode MOSFET where gate electrodes of transistors S1, S2 are coupled to bias voltages Vo and capacitor C1 has a first terminal coupled to the drain of transistor S1 and a second terminal coupled the source of transistor S2 such that voltages Vy and Vx are provided at terminals 34a, 34b of rectifier stage 34.

The intermediate voltage Vx is provided at a node of the flying half-bridge 32 and is controlled by rectifier switching elements such that said bridge switching elements can be self-driven by an output voltage of the rectifier.

Rectification stage 34 includes switching elements S3, S4, S5 and a storage element C2 coupled across rectifier stage output terminals 34c, 34d. Since the multi-step, switched-capacitor rectifier circuit does not require any magnetic circuit elements, the multi-step, switched-capacitor rectifier circuit has a topology suitable for integration on-die in complementary metal oxide semiconductor (CMOS) and other semiconductor technologies. And while the elimination of the magnetics is major factor in allowing on-die integration (since there is no efficient way to make integrated magnetics using current state-of-the-art technology), other features in the topology help for the on-die integration including, but not limited to, the self-driven feature which enables the use of circuits (e.g. switch circuits) which do not require the use of external capacitors for bootstrap/flying gate drivers. Another feature which facilitates/enables on-die integration is that a flying capacitor (e.g. capacitor C1 in FIG. 5 below) is used as a bootstrap capacitor as well for the gate driver referenced to the output voltage. This allows elimination of another external capacitor which would otherwise be required.

Moreover, the approach described herein allows a conversion with a large-amplitude input voltage using only low-voltage switch devices and capacitors, making it further suited to efficient implementation in CMOS. It will be appreciated that the present design using a plurality of low-voltage switch devices can be more efficient and more easily implemented in low-voltage processes than a design requiring high-voltage switch devices.

In the exemplary embodiment of FIG. 3, the multi-step, switched-capacitor rectifier circuit is implemented as a voltage step-down rectifier. The need for a step-down rectifier as described herein is driven by the conversion ratio of conventional rectifiers for high-frequency rectification, which do not provide a desirable step down from the ac voltage amplitude to the dc output. This places a greater burden on the transformation state to achieve a large step-down, and the efficiency a matching network (or other transformer) is often inversely proportional to the voltage conversion ratio.

In other embodiments, however, the multi-step, switched-capacitor rectifier circuit is implemented as a voltage step-up rectifier. By driving the rectifier in reverse, the rectifier can operate as an inverter having a desired (and relatively large) step-up voltage conversion ratio using only low-voltage switches and capacitors. The size of the step-up ratio depends upon the number of steps (or levels) included in the rectifier circuit and, basically is the reciprocal of the step-down ratio. Thus, for step up circuit operation, the ratio becomes $(2N)/\pi$. From the description provided herein, it should be appreciated that a minimum of two steps or levels are required to provide a step-up ratio. When implemented in this manner, the circuit provides a square wave output signal having a relatively large amplitude. This is accomplished while only requiring switch devices and capacitors having a small voltage rating. Although such a voltage step-up inverter may be considered more crude than achievable with other types of inverters (e.g. a Marx inverter), this approach takes advantage of the self-driven nature of many of the switches in a CMOS implementation to provide a distinct performance advantage (i.e. no floating drivers are required and the floating/flying switches are self-driven).

A controller circuit (not shown in FIG. 3) provides control signals to switching elements S3, S4, S5 through driver circuits to provide desired operation as will be described below in conjunction with FIGS. 4-4B. Suffice it here to say that rectifier circuit 34 operates such that a controlled voltage (either a step-down or a step-up voltage) is provided as output terminals thereof. An exemplary driver circuit will be described hereinbelow.

It should be appreciated that the topology for step-down rectification described herein allows use of a step-down ratio in the rectifier circuit which is relatively high compared with step-down ratios in conventional circuits. Conventional half bridge rectifiers, for example, have a step-down ratio of ($\pi/2$)—greater than one—between the input ac fundamental voltage to the dc output voltage.

In the multi-step, switched-capacitor rectifier described herein, however, it is possible to achieve a ($\pi/(2N)$) step-down voltage ratio—less than one for two or more steps—where the precise ratio depends upon the number of steps (or levels) included the rectifier circuit. The step-down ratio achieved is said to be relatively large compared with conventional approaches since it is possible to have a step-down ratio much smeller than 1 if the rectifier circuit includes a large number of levels. The voltage step-down system includes a matching network and a rectifier (from ac to dc). While maintaining the overall system voltage step-down ratio the same, either the rectifier or the matching network provides the voltage step down. For the matching network, the efficiency is an inverse function of the transformation ratio. The higher transformation ratio needed in the matching network, the lower efficiency it will be.

The approach described herein reduces the transformation ratio in the matching network, and thus improves efficiency.

Furthermore, in some embodiments, it is possible to leverage CMOS devices for rectification, maintain low blocking voltage for CMOS devices. It is recognized that in at least some applications a trade-off may be made between the above advantages and higher device count and greater control complexity.

Figure 3A:
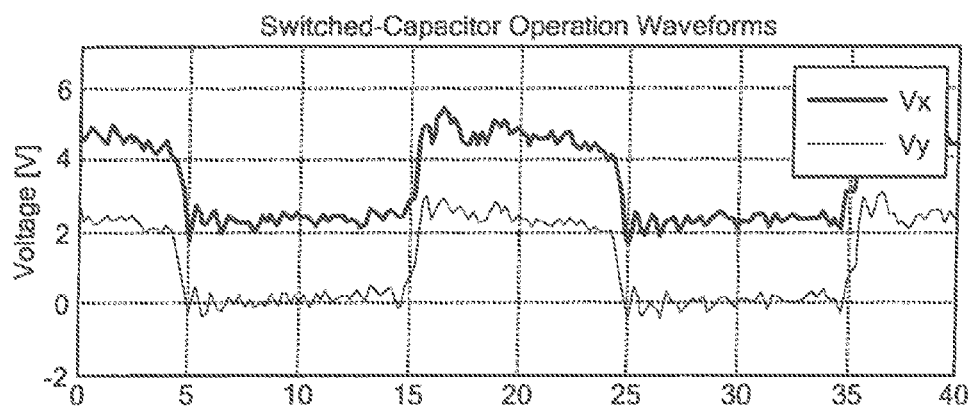
FIGS. 3A-3C are a series of waveforms illustrating the operation of the two-step switched-capacitor rectifier circuit of FIG. 3.
Figure 3B:
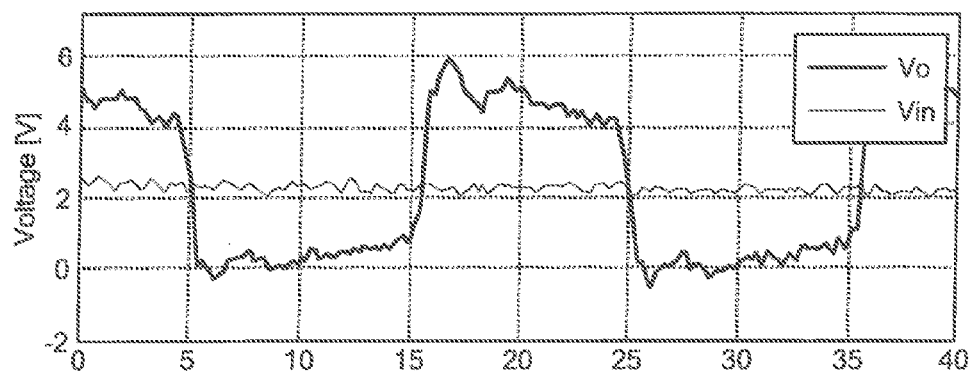
Figure 3C:
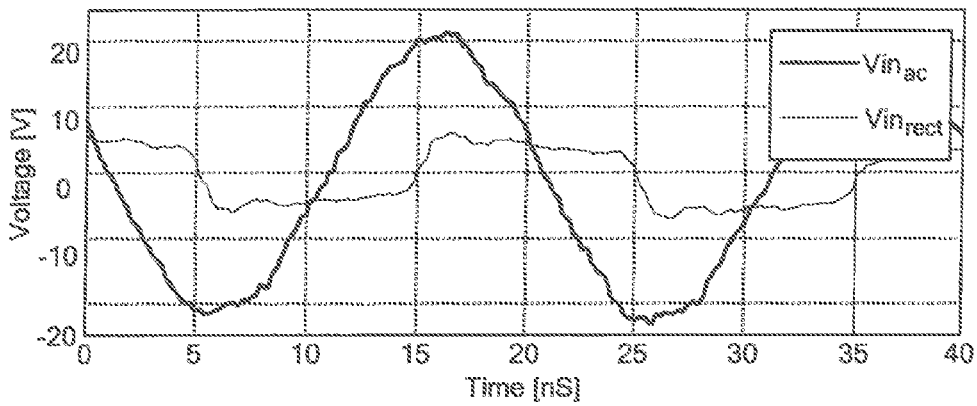

Referring now to FIGS. 3A-3C, waveforms of the two-level switched-capacitor rectifier circuit 30 of FIG. 3 are shown. The waveforms illustrate operation of the rectifier circuit. It should be noted in FIG. 3B that the input of the rectifier switches between substantially 0 volts and substantially 2Vo volts, and a step down ratio of $\pi/4$ is provided between an input ac fundamental voltage to dc output voltage in the two step SC rectifier. This step down is achieved using devices that only need to be rated for the (small) output voltage, and not the peak of the (large) input voltage.

Figure 4:
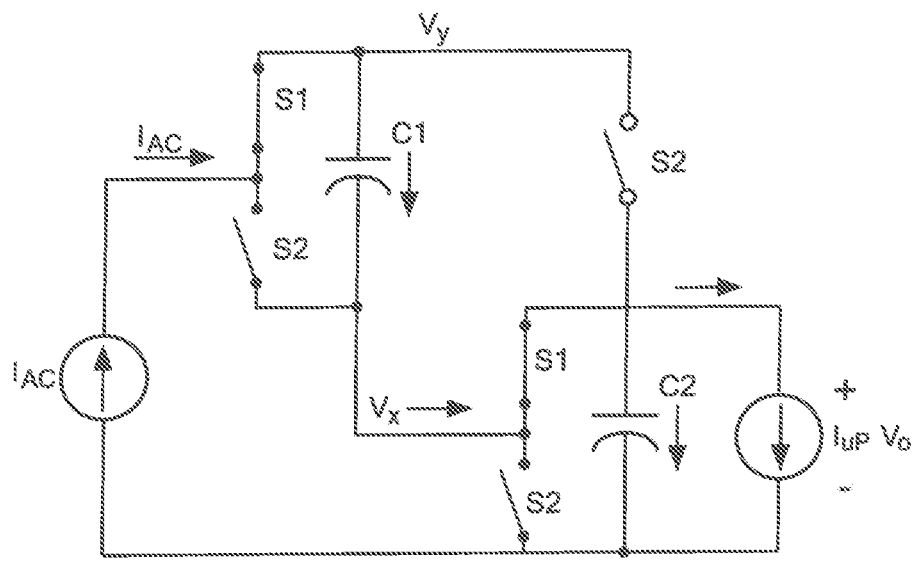
FIGS. 4 and 4A are a series of block diagrams illustrating operation of a two-step switched-capacitor rectifier circuit.
Figure 4A:
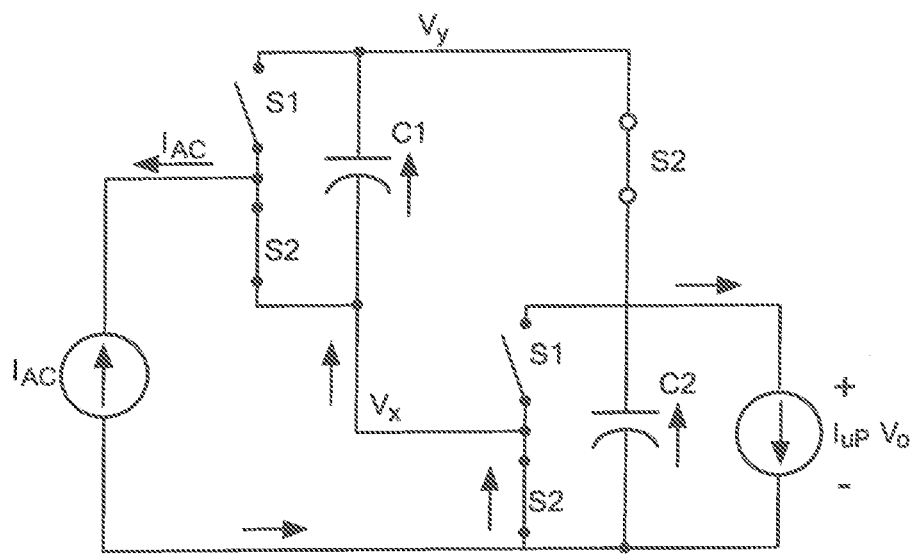

Referring now to FIGS. 4 and 4A, switch operation of the two-level switched-capacitor rectifier circuit 30 of FIG. 3 is described. With reference first to FIG. 4, when the input ac current is positive, switches labeled S1 are closed and switches labeled S2 are open. The capacitors C1 and C2 are connected such that positive current charges capacitor C1. This current recharges C2 during at least a portion of this state, and this current and the current in C2 support the load current. Since capacitors C1 and C2 both hold the same voltage Vo at steady-state, the input voltage of the SC rectifier is approximately 2Vo in this state. Thus, the input voltage of the SC rectifier during one switch state is substantially 2Vo.

When the input current is negative, switches S1 are opened and switches S2 are closed. In this case, capacitors C1 and C2 are connected in parallel to support the load and the input of the SC rectifier is shorted to the ground. As a result, the input voltage of the SC rectifier is 0 volts (V). In this case, it has a 2Vo voltage swing at the input of a rectifier, thus providing a $V_{dc}/V_{in, fundamental}=1/(4/\pi)=\pi/4$ fundamental peak ac-to-dc conversion which results in step-down in the rectification stage. Higher level versions of this switched-capacitor rectifier can provide a higher step-down ratio, but require a higher device count and greater control complexity.

The switched-capacitor rectifier operation described above illustrates that all devices in the rectifier circuit need only block the low output voltage level since they are only required to block the voltages across the capacitors. As a result, the rectifier can be implemented utilizing low voltage CMOS devices. This results in a circuit having lower switching loss and/or higher switching frequency (i.e. input ac frequency) at a given efficiency as compared to designs requiring high voltage devices. For example, in a designs operating at a few volts output, ac frequencies of 10 MHz, 20 MHz or even 50 MHz are achievable at high efficiency. For designs at output voltages of 2 V and below, ac frequencies in the VHF range such as 30 MHz, 50 MHz or even 100 MHz are achievable. As switching element S3 has its control part referenced to a dc output voltage (i.e. switching element S3 sits on top of DC output voltage), it can be driven easily. Also, switching elements S1 and S2 can be self-driven by the output voltage. A detailed control circuit for the two-step switched-capacitor circuit of FIG. 3 is described in conjunction with FIG. 5.

Figure 4B:
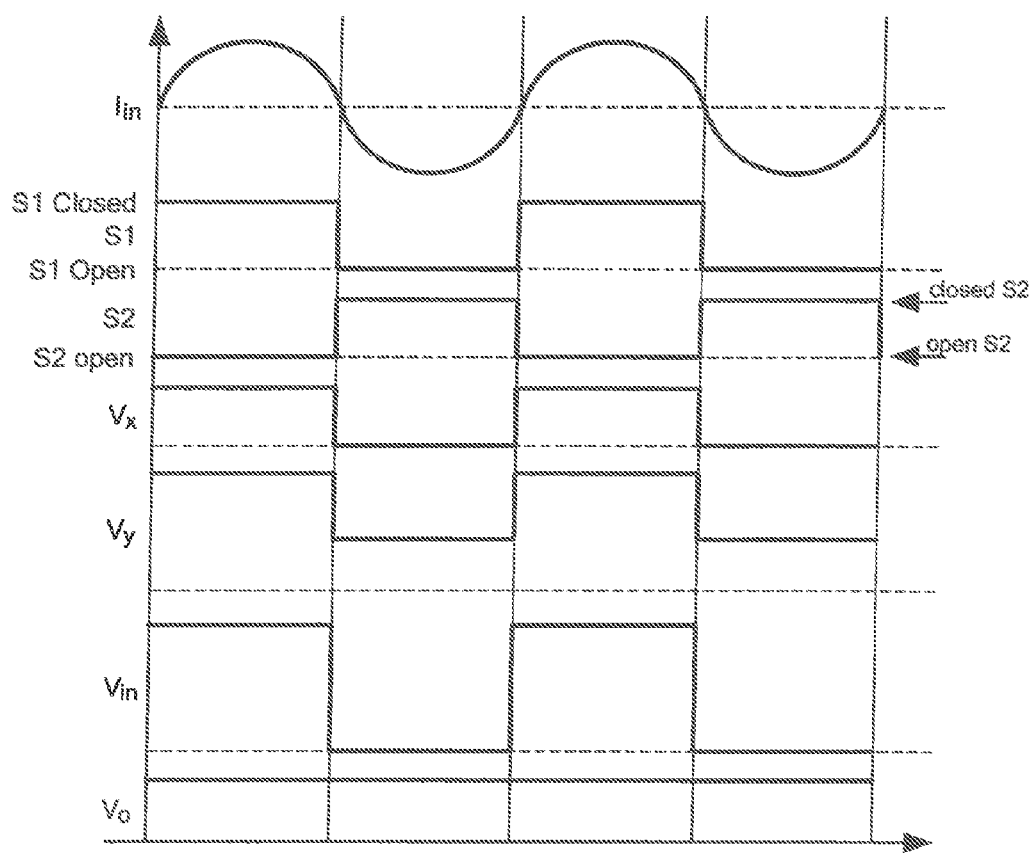
FIG. 4B is a series of waveforms illustrating the operation of the two-step switched-capacitor rectifier circuit of FIG. 3.

Referring now to FIG. 4B, a series of waveforms illustrate the theoretical switching and voltage waveforms of the two-step switched-capacitor rectifier circuit of FIG. 4. Intermediate voltage $V_x$ switches between 0 and $V_o$ volts while $V_y$ switches between $V_o$ to $2V_o$ volts and $V_{in}$ switches between 0 to $2V_o$ volts. Thus, the circuit provides an additional factor of two step down compared to a half-bridge while maintaining device and capacitor stress at a voltage level of $V_o$.

Although this example utilizes a duty ratio of 50% (i.e. a duty ratio of switching and sinusoidal input currents of approximately 50%), it is recognized that other duty ratios not specifically enumerated herein are also possible and are within the scope of the concepts, systems, circuits and techniques described herein. It is recognized, for example, that one may switch between two states with other than 50% duty ratio, and may use duty ratio as a means of control. Duty ratio will affect the relation between the input ac voltage and its frequency components and the dc output voltage. The frequency with which the rectifier is switched, and the relative phase of the rectifier operation (with respect to an inverter and/or with respect to the phase of the input current) may also be used as control mechanisms in a power conversion system. Likewise the input current may have various frequency content, including harmonics of the fundamental switching frequency and dc. One of ordinary skill in the art, after reading the description provided herein, will understand how to select a duty ratio (or duty ratios) for use in any particular application. It is recognized, for example, that one may switch between two states with other than 50% duty ratio, and may use duty ratio as a means of control. Duty ratio will affect the relation between the input ac voltage and its frequency components and the dc output voltage. The frequency with which the rectifier is switched, and the relative phase of the rectifier operation (with respect to an inverter and/or with respect to the phase of the input current) may also be used as control mechanisms in a power conversion system. Likewise the input current may have various frequency content, including harmonics of the fundamental switching frequency and dc.

Figure 5:
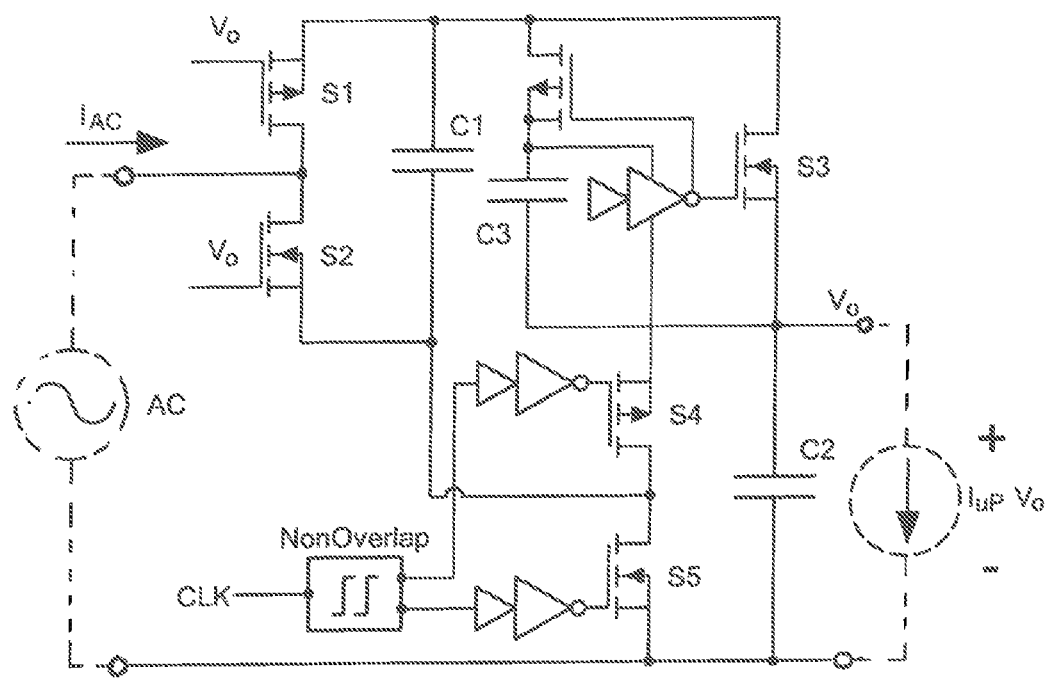
FIG. 5 is a schematic diagram illustrating control details for the switched-capacitor rectifier of FIG. 3.

Referring now to FIG. 5, a control circuit for the multi-step, switched-capacitor rectifier of the type described above in conjunction with FIGS. 3-4B is shown. A flying capacitor C1 can he used as a bootstrap capacitor to provide energy for the gate driver of switching element S3. This eliminates extra circuitry which may otherwise be required to supply power for the gate driver of switching element S3 and also reduces (and ideally minimizes) the energy storage capacitance of capacitor C3. In addition, since switching elements S1, S2, S3 and S4 share the same control pattern, only a constant voltage (illustrated as Vo in the exemplary embodiment of FIG. 5) is required to drive the gate of switching elements S1 and S2 while the node at which voltage Vx appears can be controlled by switching elements S4 and S5. As a result, the first stage switching elements S1 and S2 can be self-driven by output voltage $V_o$ as illustrated in the exemplary embodiment of FIG. 5.

It should be appreciated that the multi-step, switched-capacitor rectifier utilizes a clock circuit which provides non-overlapping pulses (i.e. a non-overlapping clock generator may be used). With the controlled dead-time (non-overlapping gap), the input current can discharge/charge the output capacitance in the switches to achieve a zero-voltage switching scheme (similar to class-D or class DE operation). In this case, switching loss due to device output capacitance can be reduced (and ideally eliminated) resulting in improved rectifier efficiency. In addition, the gate driver can be made weaker (the transition time can be longer due to lower switching loss) to reduce the loss in the gate driver.

Figure 6:
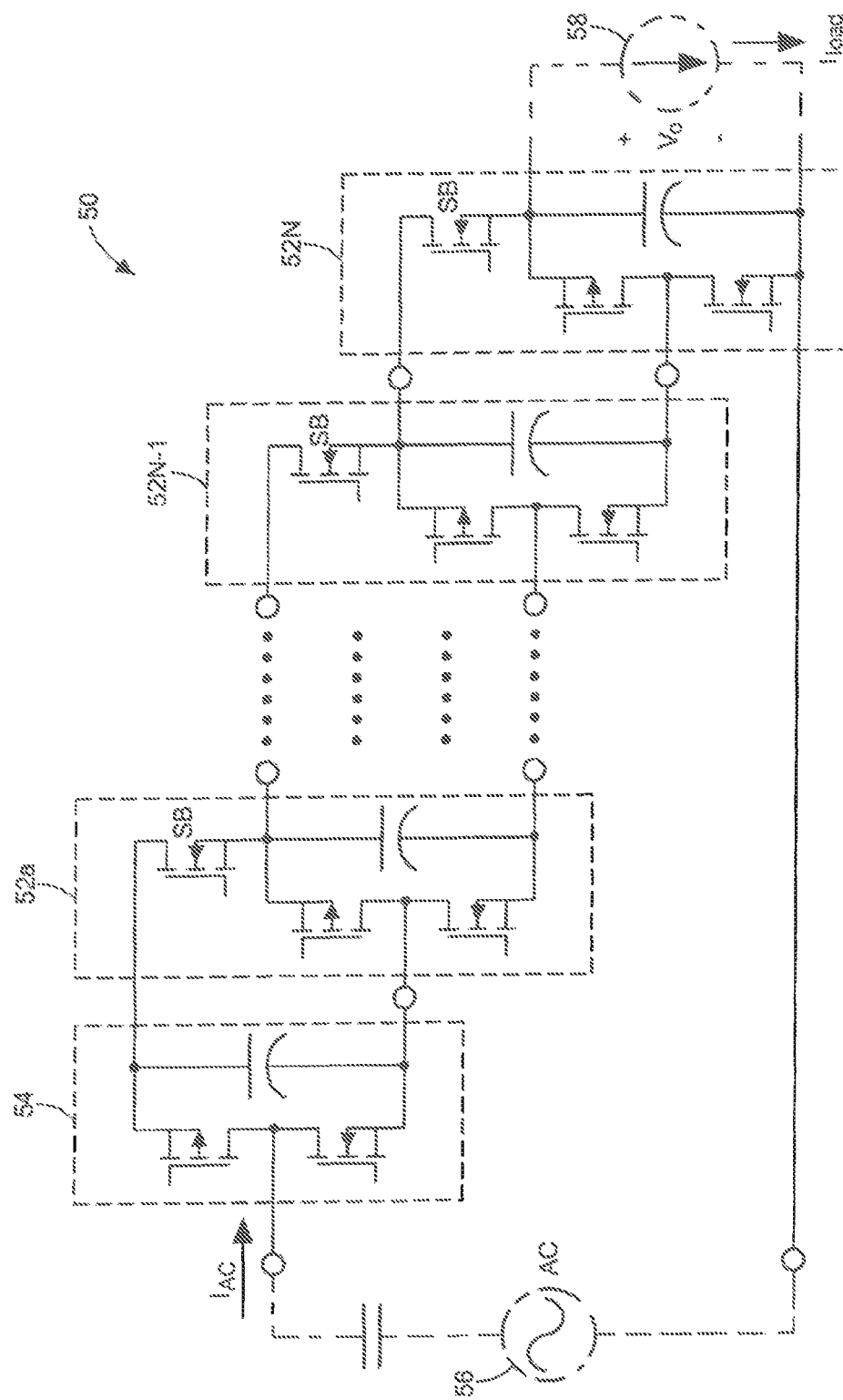
FIG. 6 is a block diagram of a multi-step switched-capacitor rectifier circuit.

Referring now to FIG. 6, a general structure of a multi-step, switched-capacitor rectifier circuit 50 includes a plurality of, here N, rectifier stages 52a-52N. A half flying bridge 54 is coupled between a source 56 and a first one of the N rectifier stages and a load 58 is coupled to an output of the Nth rectifier stage.

It should be appreciated that this rectifier is ideally driven from an inductive ac source, or an ac source that looks similar to a current source (this is because the input voltage of the rectifier is switching and controlled by the operation of the rectifier, and thus the rectifier is best driven by a current source, rather than a voltage source).

Except for the switches SB coupled to the top of the half bridges, all other switches can be replaced by diodes. In steady state operation, the voltages across all capacitors are equal to the output voltage. Whether those capacitors will be connected in series or in parallel by the operation of the switches depends upon the current direction. With this configuration, the input voltage swing of the switched-capacitor rectifier is N times the output voltage where N corresponds to the number of stages. And hence the switched-capacitor rectifier can provide a π/(2N) step-down voltage conversion ratio between the input fundamental ac peak voltage to the output dc voltage ($V_{dc}/V_{dc,pk}$). This Increases the step down transformation in the rectification stage of a dc-dc or ac-dc power converter and also minimizes the step down conversion ratio of a transformation stage in an ac power delivery system (to be discussed hereinbelow in conjunction with FIG.) to provide better performance.

It will also be recognized that this rectifier can be driven in reverse to provide an inverter having a large step-up voltage conversion ratio. When implemented in this manner, one gets a large amplitude square wave output. Although this is more crude than achievable with a Marx inverter, for example, this approach takes advantage of the self-driven nature of many of the switches in a CMOS implementation to provide a distinct performance advantage.

Figure 7:
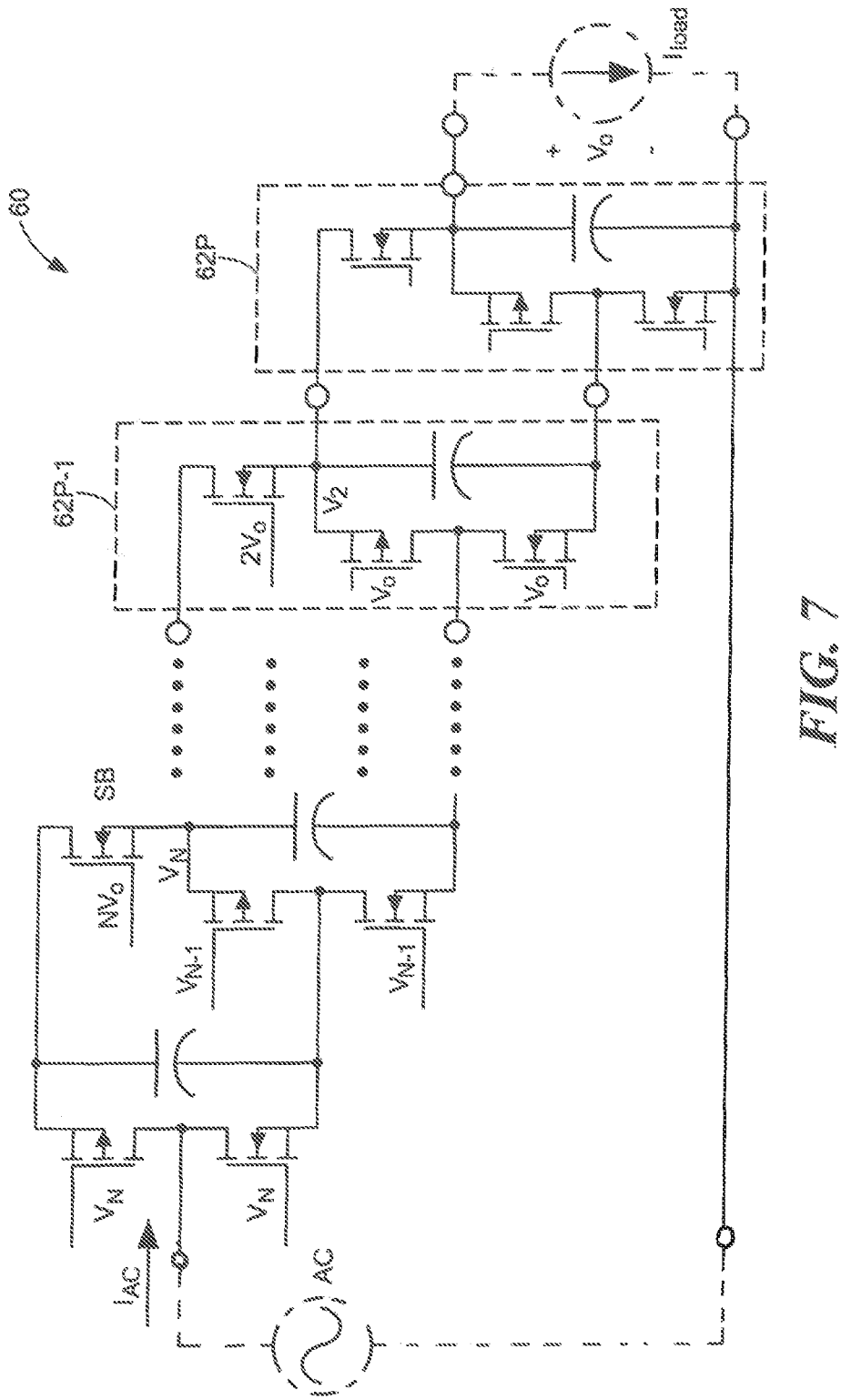
FIG. 7 is a schematic diagram illustrating a self-driven scheme for a multi-step, switched-capacitor rectifier circuit.

Referring now to FIG. 7, a driving scheme of a multi-step SC rectifier (e.g. as described above in conjunction with FIG. 6) is shown. In general, devices in the bridge of a previous stage or level (e.g. stage 62P-1) can be driven by a positive voltage of the capacitor in the next stage or level (e.g. stage 62P).

Furthermore, the devices referencing to the positive node of the flying capacitors can be driven by a dc voltage (N)(Vo) where N corresponds to the level at which the device is located in the circuit) since their reference nodes are switching with the flying capacitors. This approach greatly reduces the complexity of the driving scheme.

Only the devices in the last stage are required to be controlled and all other devices in the multi-step SC rectifier can be either self-driven or driven by a dc voltage.

Figure 8:
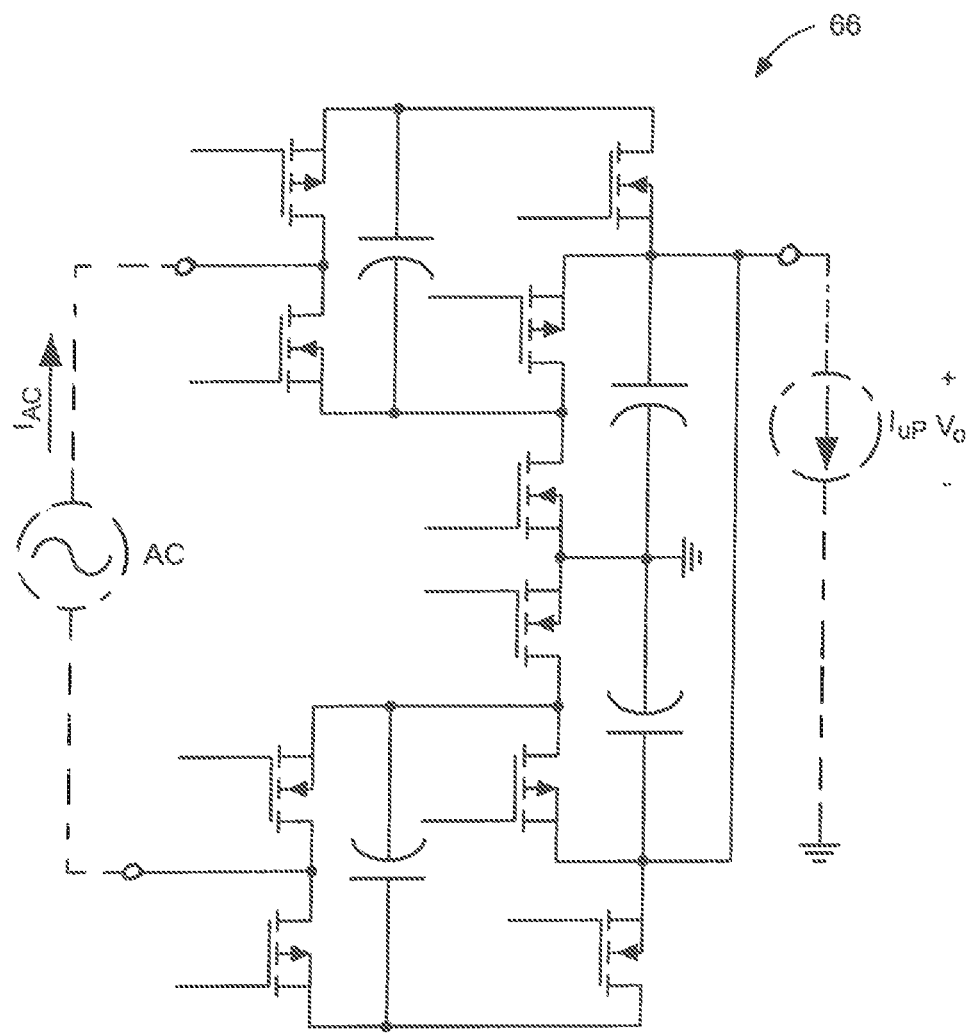
FIG. 8 is a schematic diagram of a full-bridge multi-step, switched-capacitor rectifier circuit.

Referring now to FIG. 8, a multi-step, switched-capacitor rectifier circuit 66 implemented with two bridge stages operating in complementary fashion. Each of the bridge stages are provided as half-bridges having their own capacitors (it should be noted that the two bridge stages do not form a full bridge since the respective capacitors are not connected in parallel). The SC rectifier has the same general operating pattern as a half-bridge SC rectifier (e.g. as described above in conjunction with FIGS. 3-7, for example. This exemplary embodiment, however, has two half-bridge SC rectifiers in operating complementary fashion (i.e. operating 180 degrees out of phase). In the this exemplary embodiment of the SC rectifier, the input voltage swing is +/−(N)(Vo) so the step-down voltage conversion ratio is π/(4N). Moreover, no dc voltage component is provided at the input to the rectifier in this implementation. Thus, similar to the full bridge rectifier, the multi-step, SC rectifier can also be connected as a full bridge as a way to double its voltage in the input and convert power from both polarities.

Figure 9:
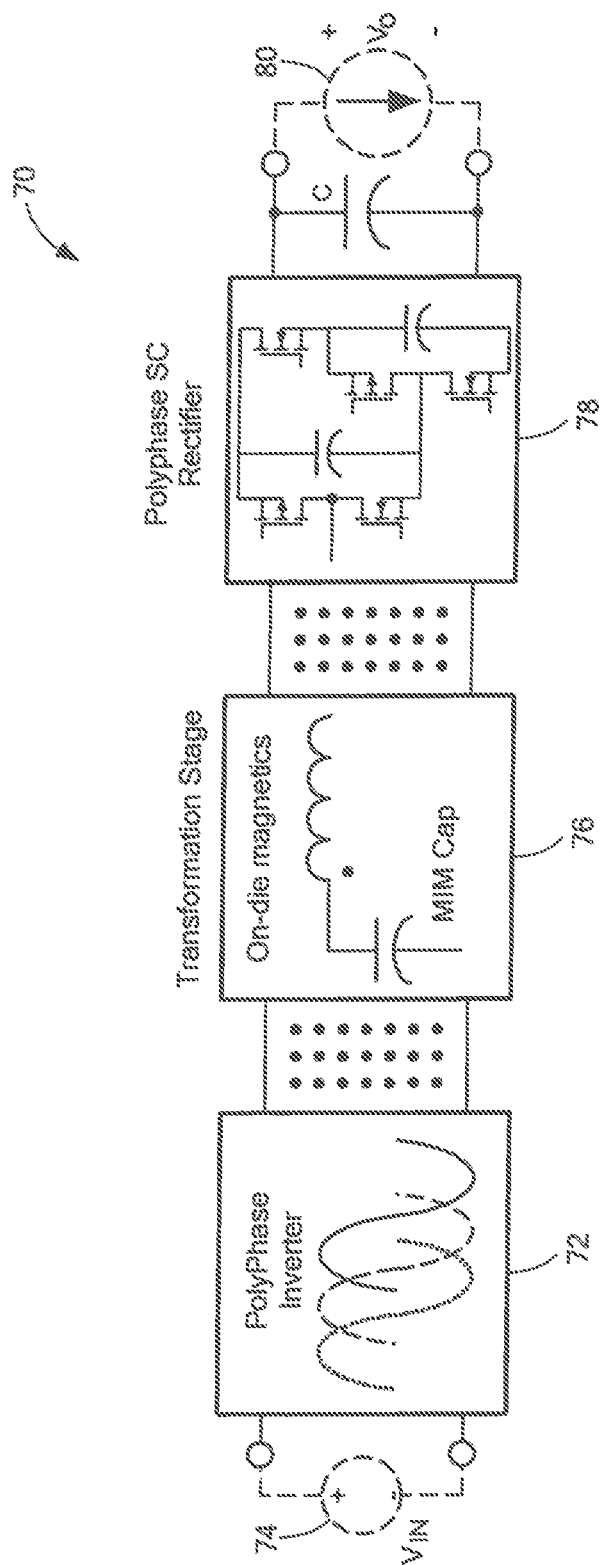
FIG. 9 is a block diagram of a polyphase system with a multi-step, switched-capacitor rectifier circuit.

Referring now to FIG. 9, a polyphase version of a multi-step, switched-capacitor rectifier may be constructed and the system architecture is shown in FIG. 9. The circuit includes 78 includes a polyphase inverter 72 having an input configured to coupled to an ac source 74 (shown in phantom since it is not properly a part of the circuit 70) and an output coupled to an input of a transformation stage 76. In one embodiment, the polyphase inverter may be provided as a three-phase GaN inverter. The transformation stage may include, for example on die magnetic elements. These on-die magnetic elements may preferably be implemented as inductors, although in some cases coupled magnetic devices (such as transformers) may be used.

An output of the transformation stage is coupled to an input of a polyphase SC rectifier circuit 78 having a storage element coupled across an output thereof (with the storage element here being illustrated as capacitor C). An output voltage Vo is provided across a load 80 (shown in phantom since it is not properly a part of the circuit 70) coupled to an output of the SC rectifier circuit 70.

Figure 10:
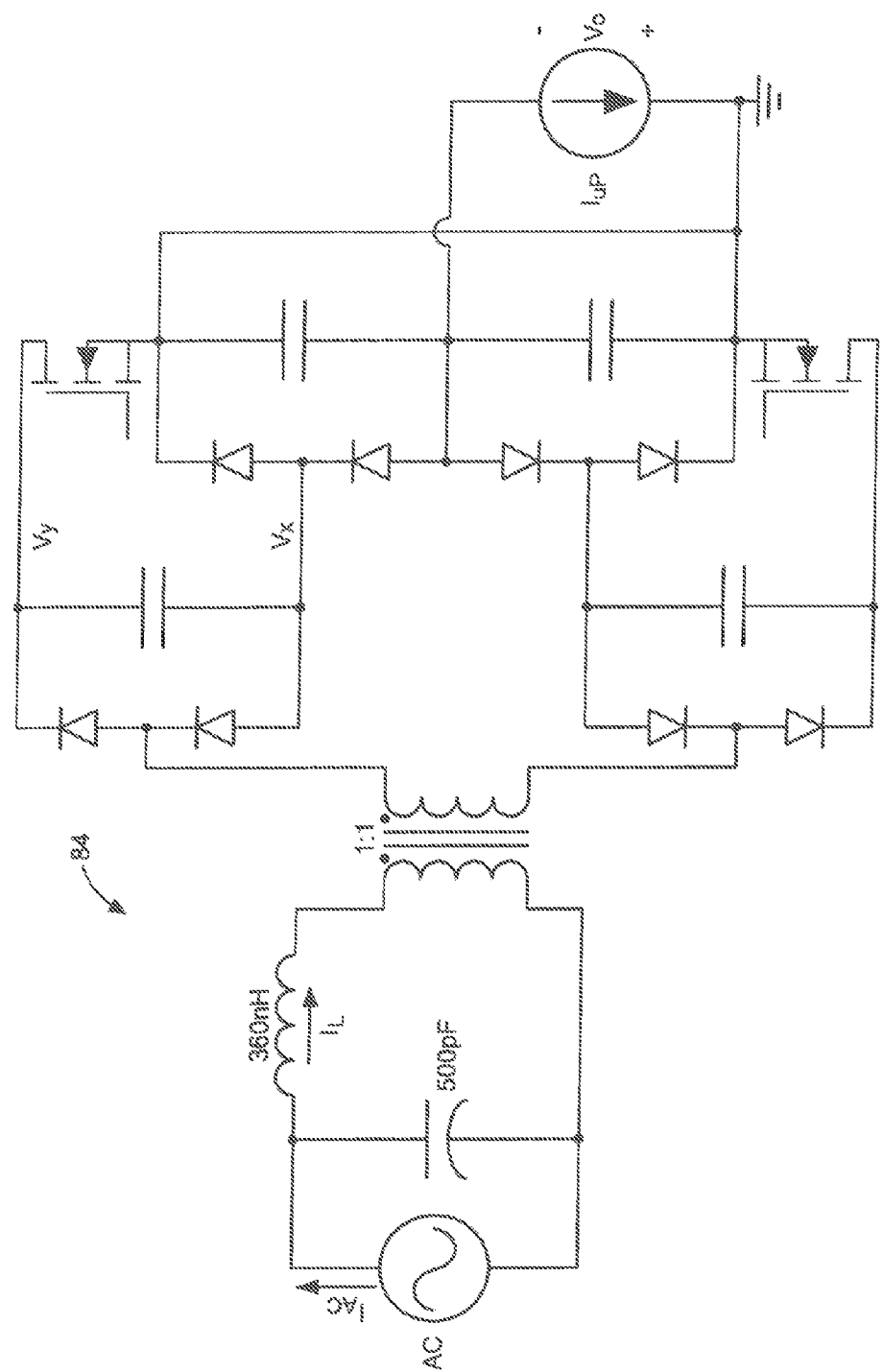
FIG. 10 is a schematic diagram of a discrete full-bridge two-step, switched-capacitor rectifier circuit implemented using diodes.

Referring now to FIG. 10, to further explore the functionality of the switched-capacitor rectifier circuit and validate the concepts and techniques described herein, an exemplary two stage full-bridge switched-capacitor rectifier circuit 84 was fabricated utilizing discrete components. The topology of the rectifier circuit 84 is illustrated in FIG. 10. The discrete rectifier circuit was designed for operating at a 10 MHz switching frequency and a 3V output voltage in magnitude with 2 W of output power. In order to simplify the control of this exemplary prototype embodiment, diodes are used in the bridges. In addition, the output voltage polarities are inverted for better PCB layout purpose (it is noted, however, that this does not affect the operation of the SC rectifier).

In the exemplary embodiment, the diodes were provided as BAT60A Infineon silicon Schottky diodes. Switches were provided as Si1012R N-Channel silicon MOSFET (Vishay) and the drivers for the switches were NC7WZ04 TinyLogic inverter manufactured by Fairchild Semiconductor. Isolation is provided by a 1:1 transformer having a BLN1728-8A/94 core. There are six turns on the transformer providing magnetizing inductance $L_m$ of 961 nH and leakage Inductance $L_l$ of 43 nH. A 360 nH Coilcraft air core inductor and a 500 pF ATC capacitor are used to form a matching network to match the input impedance of the SC rectifier to a 50 ohm ($\Omega$) output impedance of a power amplifier.

Figure 11:
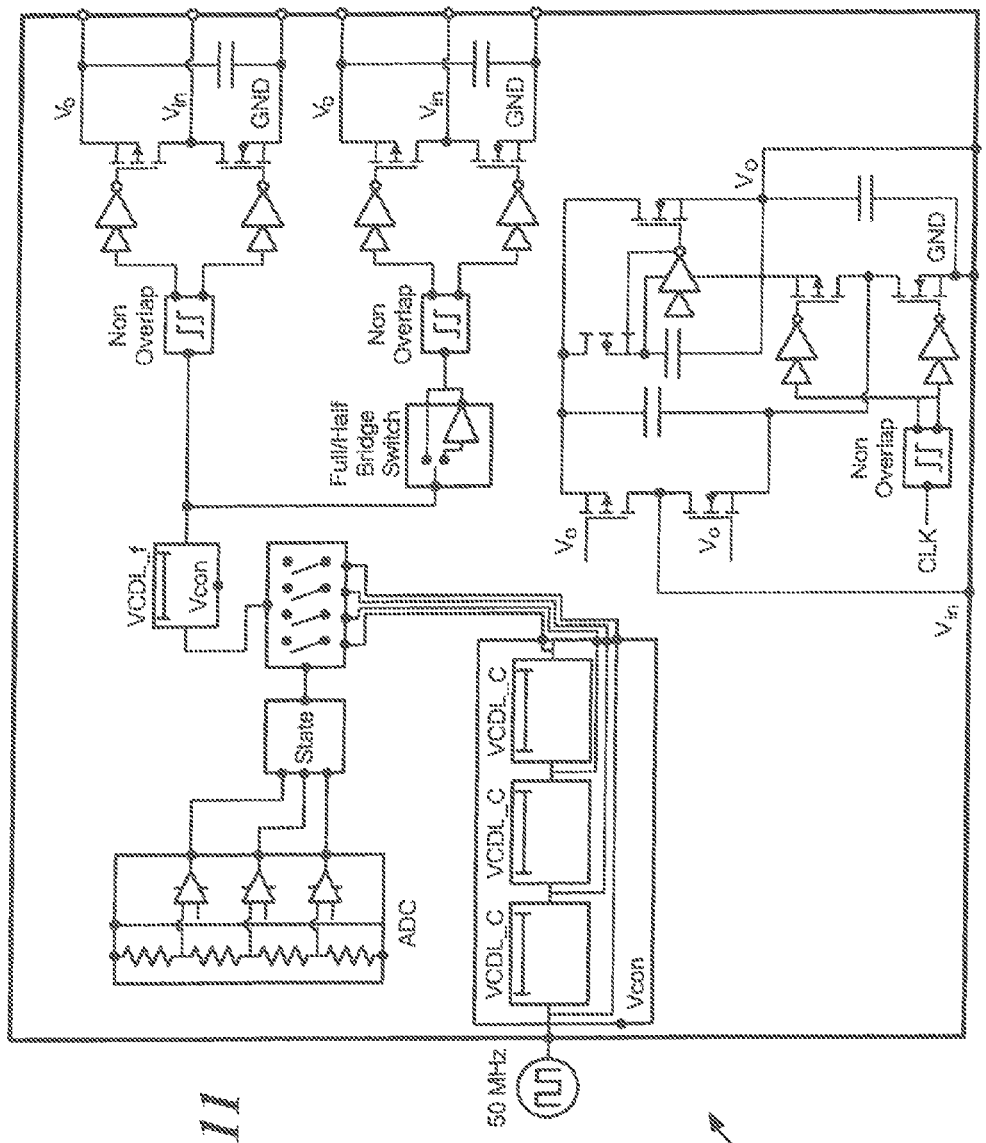
FIG. 11 is a schematic diagram of an exemplary discrete full-bridge two-step, switched-capacitor rectifier circuit.

Referring now to FIG. 11, an integrated rectifier circuit 90 for polyphase ac power delivery operates with a 2.5V output voltage, designed for 50 MHz switching frequency. The circuit can implement single or polyphase systems, can be configured as a 3-phase rectifier and can be configured into three separate full-bridge rectifiers. The circuit allows 2 W output power for each phase and thus a total of 6 W output power for the system. The system includes a full bridge switched-capacitor rectifier capable of providing 4 W output power (it should be noted that only 1 phase rectifier and half bridge switched-capacitor rectifier are shown in FIG. 11).

For an integrated three-phase rectifier, three-phase gate signals are controlled with voltage controlled delay lines, a taper factor of 8 is used for the gate driver, 1 ns dead-time is used to achieve zero-voltage-switching (ZVS) and two single bridges in parallel are provided for each phase. Thus, IC 90 includes nonoverlapping clock generation circuitry as well as tapered drivers.

As noted above a multi-step, switched-capacitor inverter circuit may be used to provide an ac power delivery system as will be described below in conjunction with FIG. 12.

Figure 12:
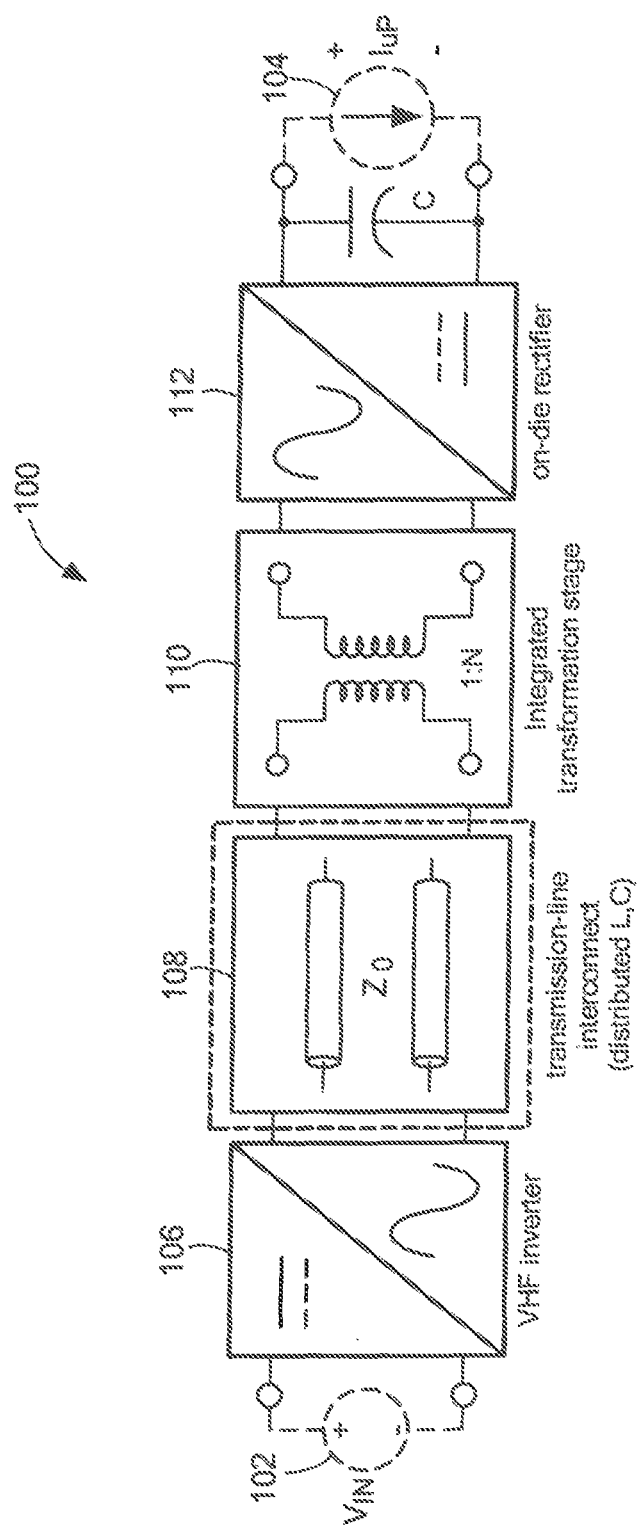
FIG. 12 is a block diagram of an ac power delivery architecture for a dc-dc converter.

Referring now to FIG. 12, an ac power delivery system 100 is coupled between a source 102 and a load 104 (with source 102 and load 104 shown in phantom since they are not properly a part of the power delivery system 100). Power delivery system 100 includes a very high frequency (VHF) inverter 106 having an input configured to accept a VHF so signal from source 102 and having an output coupled to an integrated transformation stage 110 via a transmission line interconnect circuit 108. The integrated transform stage 110 has an output coupled to an on-die rectifier 112 (i.e. a multi-step, switched-capacitor rectifier circuit). System 100 thus provides ac delivery across an interconnect at high voltage with local transformation and rectification. It should be noted that high-voltage inverter can be remote and the rectifier can use low-voltage on-die Si devices. This approach mitigates interconnect thermal and transient limits. With this approach, an ac power delivery architecture for low-voltage integrated power delivery is provided.

It has been recognized that future computation systems pose a major challenge in energy delivery that is difficult to meet with existing devices and design strategies. Delivery of power to the die at the final very low voltage requires a dominant portion of the chip in count that could otherwise be better employed for computation and communication. Moreover, conventional systems pose challenge related to voltage control (drop) and conductor loss both on die and the interconnect to the die.

It has been further recognized in accordance with the concepts, systems and techniques described herein, that to reduce interconnect bottlenecks and enable more flexible computation and energy utilization, it is desired to deliver power across the interconnect at high voltage and low current with on- or over-die transformation to low voltage and high current, while providing localized voltage regulation in numerous lanes. With the high-voltage ac distribution architecture, high-voltage discrete power devices (e.g., GaN RF transistors) can be used for the VHF inverter stage off die, generating high-voltage, low-current power at VHF frequencies (e.g. 50-100 MHz) which is delivered across the interconnect.

To accomplish this, a transformation network disposed on an integrated circuit die is used (e.g. disposed on a CMOS). This can be implemented, for example, by using integrated passive circuit elements (a/k/a "passives") on a CMOS die to form a matching network for the transformation stage. This converts the VHF power to low voltage and high current.

Integrated rectifiers of the type introduced here, using native low-voltage CMOS devices, transform the waveforms back to dc, completing the power delivery system. This limitation aside, ac distribution in this application has important merits: it allows high-voltage and low current distribution, allows the use of low-voltage CMOS rectifiers on die, and enables the inverter to be placed off die where size and loss are less important and where it can be effectively realized in a non-CMOS device process. One alternative to magnetic transformers for providing voltage transformation is the use of matching networks or immittance conversion networks, which require only inductors and capacitors to realize. Practical ac power delivery systems may include high-efficiency, high-power-density integrated inductors which operate in the very high frequency (VHF) range.

Figure 13:
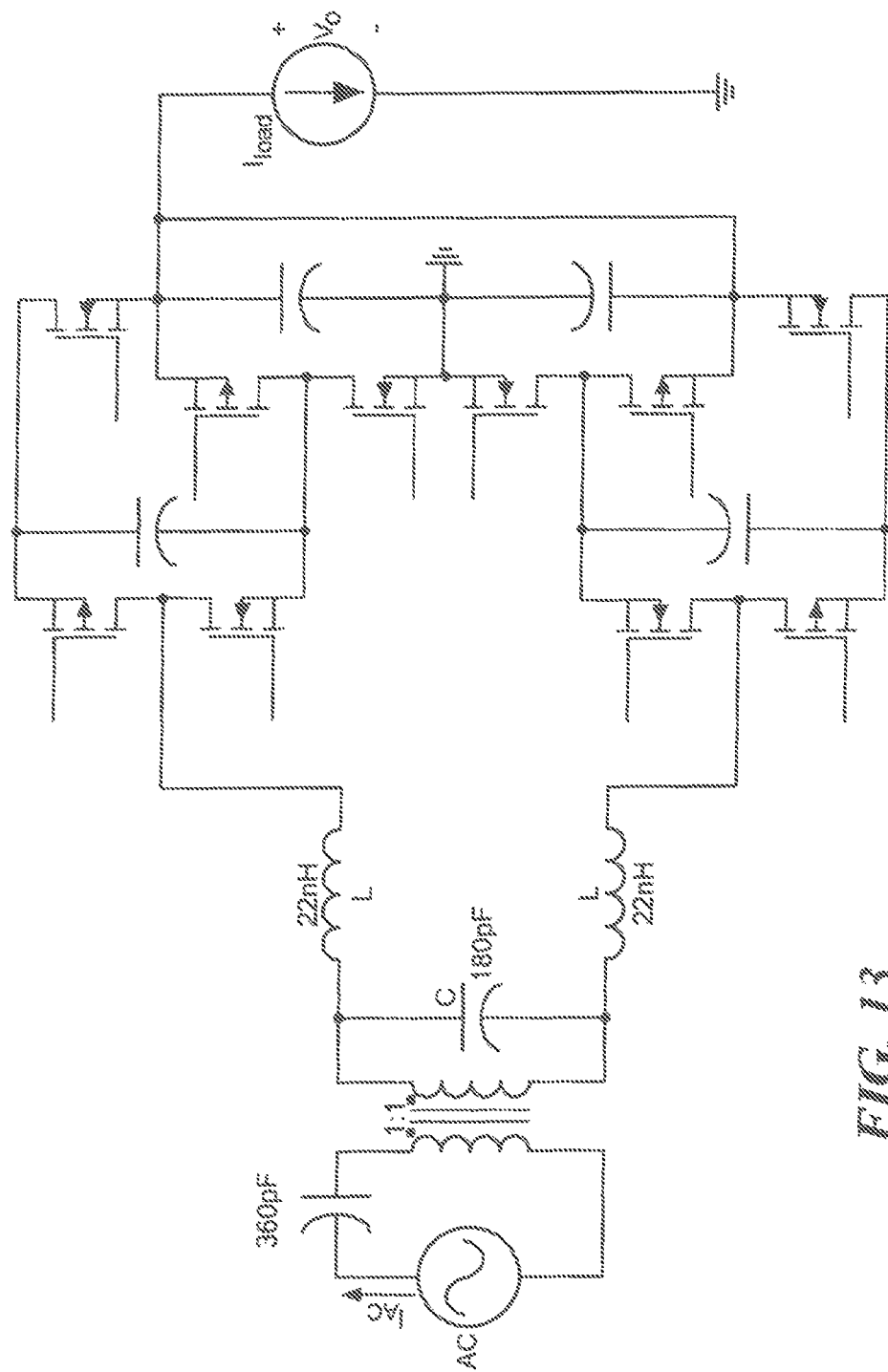
FIG. 13 is a schematic diagram of an exemplary discrete full-bridge two-step, switched-capacitor rectifier circuit.
Figure 13A:
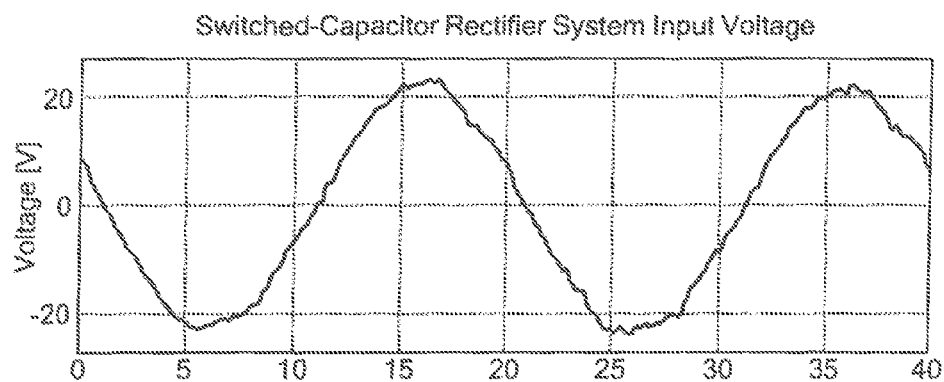
FIGS. 13A and 13B are a series of waveforms illustrating the operation of the discrete full-bridge two-step, switched-capacitor rectifier circuit of FIG. 13.
Figure 13B:
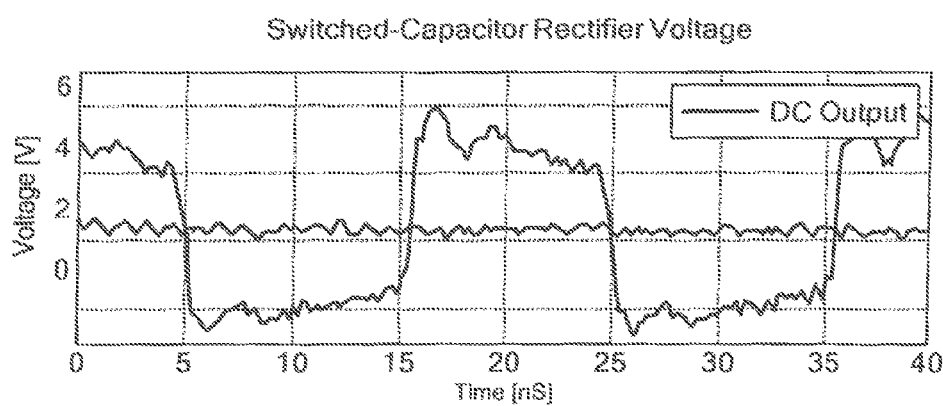

Referring now to FIG. 13, an exemplary embodiment of a multi-step, switched-capacitor full bridge rectifier circuit is shown. FIGS. 13A, 13B illustrate plots of switched capacitor rectifier system input voltage and switched capacitor rectifier voltage, respectively, for the circuit of FIG. 13. The circuit operates at an 8:1 conversion ratio with a 20 $V_{pk,in}$ ac input, 2.5V dc output and 4 W output power. AC input line-line voltage amplitude=40 V. A 1:1 hand-wound transformer is used to provide isolation (BLN1728-8A/94 core, 7 turns, $L_m$=1.2 uH and $L_{leak}$=30 nH). A 360 pF capacitor is used to resonate out leakage inductance and capacitor C (180 pF) and inductors L (22 nH) are used to form a matching network.

The apparatus and techniques described herein are not limited to the specific embodiments described. Elements of different embodiments described herein may be combined to form other embodiments not specifically set forth above. Other embodiments not specifically described herein are also the scope of the following claims.

What is claimed is:

1. A multi-step ,switched-capacitor rectifier comprising:
    a bridge stage having an input adapted to be coupled to a first alternating current (AC) source and an output, said bridge stage having a bridge capacitor and at least one bridge switching element coupled between a first terminal of said bridge capacitor and the bridge input and at least one switching element coupled between a second terminal of said bridge capacitor and the bridge input and
    one or more rectifier stages with a first one of the one or more rectifier stages having an input adapted to be coupled to an output of said bridge stage and at least one of said one or more rectifier stages having a direct current (DC) output adapted to be coupled to a load and each of said one or more rectifier stages having a rectifier capacitor and a plurality of rectifier switching elements with at least one of said rectifier switching elements coupled between a first terminal of said rectifier capacitor and a first input terminal of the rectifier stage, at least one switching element coupled between a second terminal of said rectifier capacitor and the first input terminal of said rectifier stage and at least one switching element coupled between a second terminal of said rectifier capacitor and a second input terminal of the rectifier stage, wherein in response to a positive AC current being provided to the input of said bridge stage, said at least one bridge switching element and said plurality of rectifier switching elements are configured to connect said bridge capacitor and said rectifier capacitor such that positive current charges said bridge capacitor and recharges said rectifier capacitor.

2. The multi-step, switched-capacitor rectifier of claim 1 wherein both said bridge and rectifier capacitors hold substantially the same voltage Vo at steady-state.

3. The multi-step, switched capacitor rectifier of claim 2, wherein the input voltage of the multi-step, switched-capacitor rectifier during one switch state is substantially 2Vo.

4. The multi-step, switched-capacitor rectifier of claim 1 wherein in response to a negative ac current being provided to the input of said bridge stage, each of said at least one bridge switching element and said plurality of rectifier switching elements are configured such that said bridge capacitor and said rectifier capacitor are connected in parallel to support the load.

5. The multi-step, switched-capacitor rectifier of claim 4 further comprising a transformation stage comprising one or more magnetic circuit elements provided on or off a die on which the rectifier switching elements are provided.

6. The multi-step, switched-capacitor rectifier of claim 5 wherein said magnetic circuit elements are provided as at least one of one or more transformers or one or more inductors.

7. The multi-step, switched-capacitor rectifier of claim 1 wherein an input voltage swing of the multi-step, switched-capacitor rectifier is N times the output voltage where N corresponds to the number of stages in the switched capacitor rectifier, where N is a positive integer greater than 1.

8. The multi-step, switched-capacitor rectifier of claim 7 wherein said an input voltage swing of the multi-step, switched-capacitor rectifier is N times the output voltage where N corresponds to the number of stages in the switched capacitor rectifier.

9. The multi-step, switched-capacitor rectifier of claim 1 wherein said bridge stage is a CMOS half-bridge, and wherein a first one of the one or more rectifier stages comprises a CMOS half bridge connected across the rectifier output and an additional n-channel transistor connected between the rectifier output and an input terminal of said rectifier stage.

10. The multi-step, switched-capacitor rectifier of claim 1 wherein a constant voltage is used to drive the control terminals of said bridge switching elements.

11. The multi-step, switched-capacitor rectifier of claim 1 wherein the bridge capacitor of said bridge stage provides energy for a gate driver of a switching element in at least one of said rectifier stages.

12. The multi-step, switched-capacitor rectifier of claim 1 wherein a node at which an intermediate voltage Vx is provided is controlled by rectifier switching elements.

13. The multi-step, switched-capacitor rectifier of claim 1 wherein at least one of the said at least one bridge switching elements is self-driven by an output voltage of the rectifier.

14. The multi-step, switched-capacitor rectifier of claim 1 further comprising a non-overlapping clock circuit.

15. The multi-step, switched-capacitor rectifier of claim 1 disposed on a die.

16. The multi-step, switched-capacitor rectifier of claim 1 having said rectifier switching elements disposed in a complementary metal oxide semiconductor (CMOS) semiconductor circuit.

17. The multi-step, switched-capacitor rectifier of claim 1 used in dc-dc conversion.

18. The multi-step, switched-capacitor rectifier of claim 1 used in ac power delivery to low-voltage electronics.

19. A multi-step, switched-capacitor AC-to-DC rectifier comprising:

a bridge stage having an input adapted to be coupled to an input of the switched-capacitor rectifier and an output, said bridge stage having a bridge capacitor and at least one bridge switching element coupled between a first terminal of said bridge capacitor and the bridge input and at least one switching element coupled between a second terminal of said bridge capacitor and the bridge input; and N-1 rectifier stages with a first one of the N-1 rectifier stages having an input adapted to be coupled to an output of said bridge stage and at least one of said N-1 rectifier stages having an output adapted to be coupled to a load and each of said N-1 rectifier stages having a rectifier capacitor and a plurality of rectifier switching elements with at least one of said rectifier switching elements coupled between a first terminal of said rectifier capacitor and a first input terminal of the rectifier stage, at least one switching element coupled between a second terminal of said rectifier capacitor and the first input terminal of said rectifier stage and at least one switching element coupled between a second terminal of said rectifier capacitor and a second input terminal of the rectifier stage and wherein the multi-step, switched-capacitor rectifier is provided having an architecture such that an input voltage swing of the multi-step, switched-capacitor rectifier is N times an output voltage, where N is a positive integer greater than 2, wherein, in response to a positive AC current being provided to the input of said bridge stage, said at least one bridge switching element and said plurality of rectifier switching elements are configured to connect said bridge capacitor and said rectifier capacitor such that positive current charges said bridge capacitor and recharges said rectifier capacitor.

20. A multi-step, switched-capacitor rectifier comprising:

a bridge stage comprising a first bridge switching element, a second bridge switching element, and a bridge capacitor, wherein the first bridge switching element is coupled between an AC source coupled to an input node of the bridge stage and a first terminal of the bridge capacitor, the second bridge switching element is coupled between the source and a second terminal of the bridge capacitor, the first terminal of the bridge capacitor coupled to a first output node of the bridge stage, and the second terminal of the bridge capacitor coupled to a second output node of the bridge stage; and N rectifier stages, where N is a positive integer greater than 2, each of the N rectifier stages comprising a first rectifier input node, a second rectifier input node, a first rectifier output node, a second rectifier output node, a first rectifier switching element, a second rectifier switching element, a third rectifier switching element, and a rectifier capacitor, wherein the first rectifier switching element is coupled between the first rectifier input node and a first terminal of the rectifier capacitor, the second rectifier switching element is coupled between the first rectifier input node and a second terminal of the rectifier capacitor, and the third rectifier switching element is coupled between the second rectifier input node and the first terminal of the rectifier capacitor, the first terminal of the rectifier capacitor coupled to the first rectifier output node, and the second terminal of the rectifier capacitor coupled to the second rectifier output node;

wherein, for a first rectifier stage of the N rectifier stages, the first rectifier input node is coupled to the first output node of the bridge stage, and the second rectifier input node is coupled to the second output node of the bridge stage;

wherein, for each of a second rectifier stage to an N-1 rectifier stage of the N rectifier stages, the first rectifier input node of each rectifier stage is coupled to the first output node of a previous rectifier stage, the second rectifier input node of each rectifier stage is coupled to the second output node of a previous rectifier stage;

wherein, for an Nth rectifier stage of the N rectifier stages, the first rectifier input node of the Nth rectifier stage is coupled to the first output node of the N-1 rectifier stage, the second rectifier input node of the Nth rectifier stage is coupled to the second output node of the N-1 rectifier stage, and a load is coupled between the first output node of the Nth rectifier stage and the second output node of the Nth rectifier stage to provide a DC output voltage to the load, wherein the multi-step, switched-capacitor rectifier provides an input voltage swing such that a voltage of the source is N times the output voltage provided to the load, and wherein, in response to a positive AC current being provided to the input of said bridge stage, said first bridge switching element, said second bridge switching element, said first rectifier switching element, said second rectifier switching element, and said third rectifier switching element are configured to connect said bridge capacitor and said rectifier capacitor such that positive current charges said bridge capacitor and recharges said rectifier capacitor.

* * * * *

UNITED STATES PATENT AND TRADEMARK OFFICE
CERTIFICATE OF CORRECTION

PATENT NO. : 9,450,506 B2
APPLICATION NO. : 14/416654
DATED : September 20, 2016
INVENTOR(S) : David J. Perreault et al.

It is certified that error appears in the above-identified patent and that said Letters Patent is hereby corrected as shown below:

In the Specification

Column 2, Line 30-31 delete "inputs input terminals" and replace with --input. Input terminals--.

Column 3, Line 43 delete "same the as" and replace with --same die as--.

Column 7, Line 46 delete "circuit 30 is" and replace with --circuit 30) is--.

Column 9, Line 23 delete "smeller" and replace with --smaller--.

Column 11, Line 60 delete "with FIG.)" and replace with --with FIG. 12)--.

Column 12, Line 12 delete "the circuit) since" and replace with --the circuit since--.

Column 12, Line 26 delete "for example." and replace with --for example).--.

Column 12, Line 29 delete "In the this" and replace with --In this--.

Column 12, Line 40 delete "includes 78 includes" and replace with --70 includes--.

Column 13, Line 42 delete "VHF so" and replace with --VHF ac--.

Column 14, Line 53 delete "multi-step ,switched-capacitor" and replace with --multi-step, switched-capacitor--.

Signed and Sealed this
Third Day of October, 2017

Joseph Matal
*Performing the Functions and Duties of the
Under Secretary of Commerce for Intellectual Property and
Director of the United States Patent and Trademark Office*